United States Patent
Martin et al.

(10) Patent No.: US 9,983,771 B2
(45) Date of Patent: May 29, 2018

(54) PROVISION OF AN OPEN INSTANCE OF AN APPLICATION

(75) Inventors: John Martin, San Francisco, CA (US); Andrew Borovsky, New York, NY (US); Graham Phillip Oldfield, South Woodford (GB); Richard Michael Collin, East Sussex (GB)

(73) Assignee: Nokia Technologies Oy, Espoo (FI)

( * ) Notice: Subject to any disclaimer, the term of this patent is extended or adjusted under 35 U.S.C. 154(b) by 482 days.

(21) Appl. No.: 13/814,639

(22) PCT Filed: Dec. 28, 2011

(86) PCT No.: PCT/EP2011/074178
§ 371 (c)(1),
(2), (4) Date: May 7, 2013

(87) PCT Pub. No.: WO2013/097895
PCT Pub. Date: Jul. 4, 2013

(65) Prior Publication Data
US 2014/0136986 A1    May 15, 2014

(51) Int. Cl.
*G06F 3/0484* (2013.01)
*G06F 3/0488* (2013.01)
(Continued)

(52) U.S. Cl.
CPC ........ *G06F 3/04842* (2013.01); *G06F 3/0485* (2013.01); *G06F 3/0488* (2013.01); *G06F 3/04845* (2013.01); *G06F 3/1438* (2013.01); *G06F 2203/04803* (2013.01); *G06F 2203/04806* (2013.01); *G06F 2203/04808* (2013.01);
(Continued)

(58) Field of Classification Search
CPC .............. G06F 3/04842; G06F 3/0488; G06F 2203/04808; G06F 3/0484
See application file for complete search history.

(56) References Cited

U.S. PATENT DOCUMENTS 6,154,843 A    11/2000 Hart et al.
6,311,209 B1   10/2001 Olson et al.
(Continued)

FOREIGN PATENT DOCUMENTS

CN    1658149 A    8/2005
CN    1682546 A    10/2005
(Continued)

OTHER PUBLICATIONS

Chong, M.K. et al., GesturePIN: Using Discrete Gestures for Associating Mobile Devices, MobileHCI'10, Sep. 7-10, 2010, Lisbon Portugal, pp. 261-264.
(Continued)

*Primary Examiner* — Andrea Leggett
(74) *Attorney, Agent, or Firm* — Harrington & Smith

(57) ABSTRACT

An apparatus including at least one processor; and at least one memory including computer program code, the at least one memory and the computer program code configured to, with the at least one processor, cause the apparatus to perform at least the following: receive a user input; and based on the user input, provide an open instance of a first application on a first device as a corresponding open instance of at least a related application on a second device.

36 Claims, 10 Drawing Sheets

(51) Int. Cl.
*G06F 3/0485* (2013.01)
*G06F 3/14* (2006.01)
*H04M 1/725* (2006.01)

(52) U.S. Cl.
CPC ..... *G09G 2360/02* (2013.01); *G09G 2360/04* (2013.01); *G09G 2370/022* (2013.01); *H04M 1/7253* (2013.01)

(56) References Cited

U.S. PATENT DOCUMENTS

| | | |
|---|---|---|
| 6,463,299 B1 | 10/2002 | Macor |
| 6,947,975 B2 | 9/2005 | Wong et al. |
| 7,479,949 B2 | 1/2009 | Jobs et al. |
| 7,620,906 B2 | 11/2009 | Igeta |
| 7,623,892 B2 | 11/2009 | Hawkins |
| 8,214,747 B1 | 7/2012 | Yankovich et al. |
| 8,224,894 B1 | 7/2012 | Parks ............... H04W 4/008 709/203 |
| 8,255,360 B1 | 8/2012 | Wallace et al. |
| 8,588,824 B2 | 11/2013 | Rowe |
| 8,656,080 B2 | 2/2014 | Shin |
| 8,751,444 B2 | 6/2014 | Wallace et al. |
| 8,812,987 B2 | 8/2014 | Joynes et al. |
| 2002/0116455 A1 | 8/2002 | Mitchell et al. |
| 2004/0006551 A1 | 1/2004 | Sahinoja et al. |
| 2004/0019676 A1 | 1/2004 | Iwatsuki et al. |
| 2004/0024819 A1* | 2/2004 | Sasaki ............... H04L 12/1813 709/205 |
| 2004/0117409 A1 | 6/2004 | Scahill et al. |
| 2004/0150664 A1 | 8/2004 | Baudisch .................. 345/740 |
| 2005/0028221 A1 | 2/2005 | Liu et al. .................. 725/133 |
| 2005/0060179 A1 | 3/2005 | Tinberg et al. |
| 2005/0086309 A1 | 4/2005 | Galli et al. |
| 2005/0168399 A1 | 8/2005 | Palmquist .................. 345/1.1 |
| 2005/0198578 A1 | 9/2005 | Agrawala et al. |
| 2006/0041893 A1 | 2/2006 | Castro et al. |
| 2006/0101054 A1 | 5/2006 | Dempski et al. |
| 2006/0242278 A1 | 10/2006 | Hawkins |
| 2006/0284758 A1 | 12/2006 | Stilwell et al. |
| 2006/0284785 A1 | 12/2006 | Bitterlich .................. 345/1.1 |
| 2007/0054627 A1 | 3/2007 | Wormald ............ G06F 9/4856 455/70 |
| 2007/0124503 A1* | 5/2007 | Ramos ............... G06F 3/017 709/248 |
| 2007/0127426 A1 | 6/2007 | Watters et al. |
| 2007/0250645 A1 | 10/2007 | Meadows et al. |
| 2008/0081558 A1 | 4/2008 | Dunko et al. |
| 2008/0154907 A1 | 6/2008 | Prasad ............... G06F 17/3005 |
| 2008/0160974 A1 | 7/2008 | Vartiainen et al. |
| 2008/0207128 A1 | 8/2008 | Mikko ................... 455/41.2 |
| 2009/0006946 A1 | 1/2009 | Takeuchi |
| 2009/0058830 A1 | 3/2009 | Herz et al. |
| 2009/0143056 A1 | 6/2009 | Tang et al. |
| 2009/0172565 A1 | 7/2009 | Jackson et al. |
| 2009/0204966 A1 | 8/2009 | Johnson et al. |
| 2009/0213032 A1 | 8/2009 | Newport et al. |
| 2009/0303676 A1 | 12/2009 | Behar et al. ............. 361/679.27 |
| 2009/0327302 A1 | 12/2009 | Richardson et al. |
| 2010/0066643 A1 | 3/2010 | King et al. .................. 345/1.3 |
| 2010/0071038 A1 | 3/2010 | Flynn et al. |
| 2010/0082136 A1 | 4/2010 | Rosenblatt et al. |
| 2010/0093399 A1 | 4/2010 | Kim et al. |
| 2010/0185956 A1 | 7/2010 | Anantharaman et al. |
| 2010/0231735 A1 | 9/2010 | Burian et al. ............. 348/220.1 |
| 2010/0259486 A1 | 10/2010 | Anson et al. ............. 345/173 |
| 2010/0262925 A1 | 10/2010 | Liu ..................... G06Q 10/10 715/759 |
| 2010/0281363 A1 | 11/2010 | Inaba |
| 2011/0018982 A1 | 1/2011 | Shibamiya et al. ........... 348/54 |
| 2011/0058052 A1 | 3/2011 | Bolton et al. |
| 2011/0065384 A1 | 3/2011 | Gader et al. |
| 2011/0066871 A1 | 3/2011 | Farmer ..................... G06F 1/32 713/340 |
| 2011/0081923 A1 | 4/2011 | Forutanpour et al. ........ 455/457 |
| 2011/0117898 A1 | 5/2011 | Pereira ............... H04L 12/5835 455/414.4 |
| 2011/0126141 A1 | 5/2011 | King et al. .................. 715/769 |
| 2011/0158138 A1 | 6/2011 | Vivek |
| 2011/0165841 A1* | 7/2011 | Baek ..................... H04L 67/10 455/41.2 |
| 2011/0197153 A1 | 8/2011 | King et al. |
| 2011/0276911 A1 | 11/2011 | Choi |
| 2011/0289147 A1* | 11/2011 | Styles .................... G06F 3/017 709/205 |
| 2011/0289157 A1 | 11/2011 | Pirnazar |
| 2011/0307841 A1 | 12/2011 | Boldyrev et al. ............ 715/863 |
| 2012/0084356 A1 | 4/2012 | Ferdi |
| 2012/0096076 A1 | 4/2012 | Chan ................... G06F 9/4856 709/203 |
| 2012/0139951 A1 | 6/2012 | Hwang et al. |
| 2012/0290657 A1 | 11/2012 | Parks et al. |
| 2012/0290730 A1 | 11/2012 | Desai et al. |
| 2012/0317508 A1 | 12/2012 | Schone et al. |
| 2013/0007499 A1 | 1/2013 | Moy .................... G06F 3/1423 713/400 |
| 2013/0013560 A1 | 1/2013 | Goldberg et al. |
| 2013/0046935 A1 | 2/2013 | Ramanathan ..... G06F 17/30132 711/119 |
| 2013/0047008 A1 | 2/2013 | Shin |
| 2013/0097234 A1 | 4/2013 | Beinvel et al. |
| 2013/0262706 A1 | 10/2013 | Stahlberg et al. |
| 2013/0275994 A1 | 10/2013 | Uola et al. |

FOREIGN PATENT DOCUMENTS

| | | |
|---|---|---|
| CN | 101095110 A | 12/2007 |
| CN | 101534411 A | 9/2009 |
| CN | 101662667 A | 3/2010 |
| CN | 102150126 A | 8/2011 |
| CN | 102202355 A | 9/2011 |
| CN | 102238281 A | 11/2011 |
| EP | 1215575 A2 | 6/2002 |
| EP | 1760584 A1 | 3/2007 |
| EP | 2106186 A1 | 9/2009 |
| EP | 2161960 A2 | 3/2010 |
| EP | 2261793 A2 | 12/2010 |
| EP | 2385462 A1 | 9/2011 |
| EP | 2487871 A1 | 8/2012 |
| GB | 2468893 A | 9/2010 |
| GB | 2498229 A | 7/2013 |
| JP | 2009/130876 A | 6/2009 |
| JP | 11-95931 A | 4/2011 |
| KR | 20110056314 A | 5/2011 |
| KR | 20110080348 A | 7/2011 |
| KR | 20110123099 A | 11/2011 |
| WO | 2005/051020 A1 | 6/2005 |
| WO | 2005/109829 A1 | 11/2005 |
| WO | 2009/152316 A1 | 12/2009 |
| WO | 2010028405 A1 | 3/2010 |
| WO | 2010/063873 A1 | 6/2010 |
| WO | WO-2011/127201 A1 | 10/2011 |
| WO | WO-2011-127201 A1 | 10/2011 |
| WO | WO-2013/097878 A1 | 7/2013 |

OTHER PUBLICATIONS

Menges J. et al., Inverting X: An Architecture for a Shared Distributed Window System, ( Proc., Third Workshop on Enabling Technologies: Infrastructure for Collaborative Enterprises, IEE Computer Society Press, Apr. 1994, pp. 53-64) pp. 1-11.

Peng, C. et al., Point&Connect: Intention Based Device Pairing for Mobile Phone Users, MobiSys'09, Jun. 22-25, 2009, Krakow, Poland, pp. 137-149.

Schuckmann, C. et al., Modeling Collaboration Using Shared Objects, Group 99, Phoenix, AZ, ACM 1999, pp. 189-198.

Shim, H.S. et al., Providing Flexible Services for Managing Shared State in Collaborative Systems, Proceedings of the Fifth European Conference on Computer Supported Cooperative Work, Kluwer Academic Publishers, Netherlands, 1997, pp. 237-252.

(56) References Cited

OTHER PUBLICATIONS

Bagrodia, R. et al.; "iMASH: Interactive Mobile Application Session Handoff"; Mobisys. The International Conference on Mobile Systems, Applications and Services; May 8, 2003; pp. 1-14; XP002303521.

De Carvalho, L., et al.; "Synchronizing Web Browsing Data with Browserver"; Computers and Communications (ISCC), 2010 IEEE Symposium; Jun. 22, 2010; pp. 738-743; XP031731309; Piscataway, NJ, USA.

Article HT3819; "Understanding Home Sharing"; Retrieved from the Internet http://support.apple.com/kb/HT3819; accessed May 21, 2012; whole document.

Article HT2688; "iTunes: How to share music and video"; Retrieved from the Internet http://support.apple.com/kb/HT2688; accessed May 21, 2012, whole document.

"Touch Gesture Reference Guide" [online—retrieved May 19, 2015]; Retrieved from the Internet: <URL: http://static.lukew.com/TouchGestureGuide.pdf>; Apr. 15, 2010; 7 pages.

Ramos, G. et al. "Synchronous Gestures in Multi-Display Enviroments"; In the Jour. of Human-Computer Interaction; vol. 24, Issue 1-2 pp. 117-169; Apr. 21, 2009.

Lucero, A. et al., *Collaborative Use of Mobile Phones for Brainstorming*,MobileHCI'10 (Sep. 7-10, 2011), 337-340.

Lyons, K. et al., *Multi-Display Composition: Supporting Display Sharing for Collocated Mobile Devices*, Interact 2009, Part I, LNCS 4726 (2009) 758-771.

Melchior, Jeremie, et al., "A Toolkit for Peer-to-eer Distributed User Interfaces: Concepts, Implementation, and Applications", In Proceedings of the First ACM SIGCHI Symposium on Engineering Interactive Computing Systems, Jul. 2009, pp. 69-78.

Luyten, Kris, et al., "Distributed User Interface Elements to support Smart Interaction Spaces", In Proceedings of the Seventh IEEE International Symposium on Multimedia, Dec. 2005, 8 pgs.

Bandelloni, Renata, et al., "Flexible Interface Migration", In Proceedings of the Ninth International Conference on Intelligent User Interfaces, ACM, Jan. 2004, 9 pgs.

Demeure, Alexandre, et al., "The 4C Reference Model for Distributed User Interfaces", In Proceedings of the Fourth International Conference on Autonomic and Autonomous Systems, ICAS 2008, Mar. 2008, 9 pgs.

\* cited by examiner

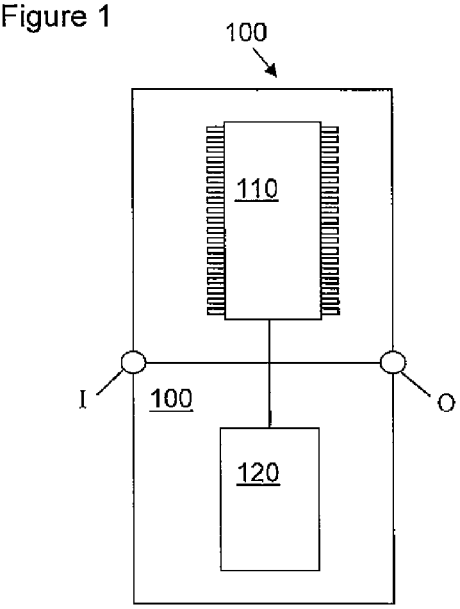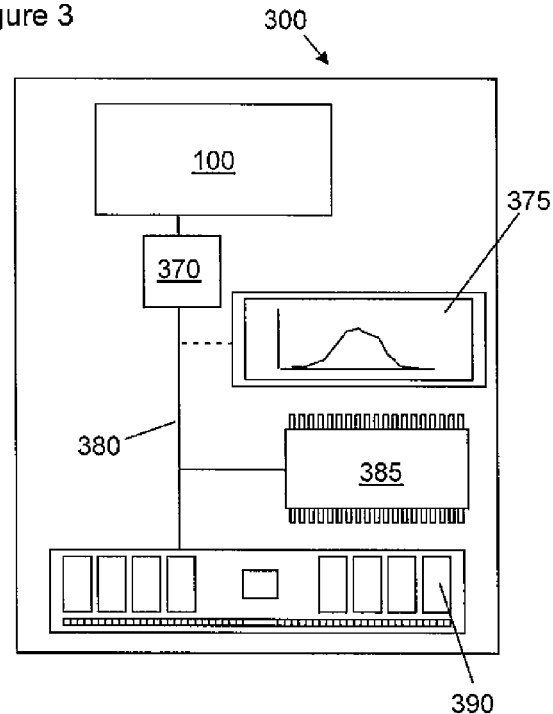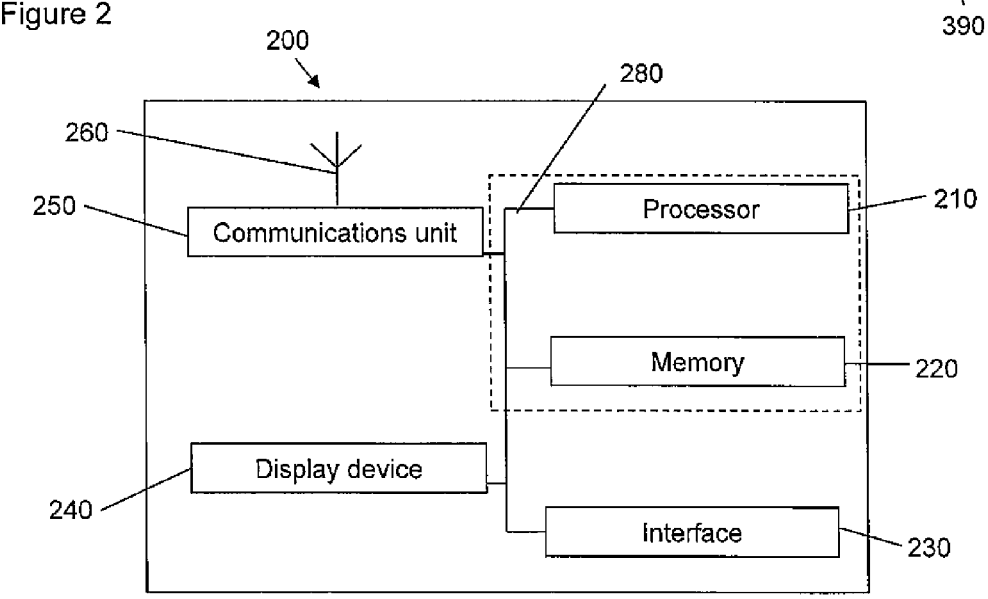

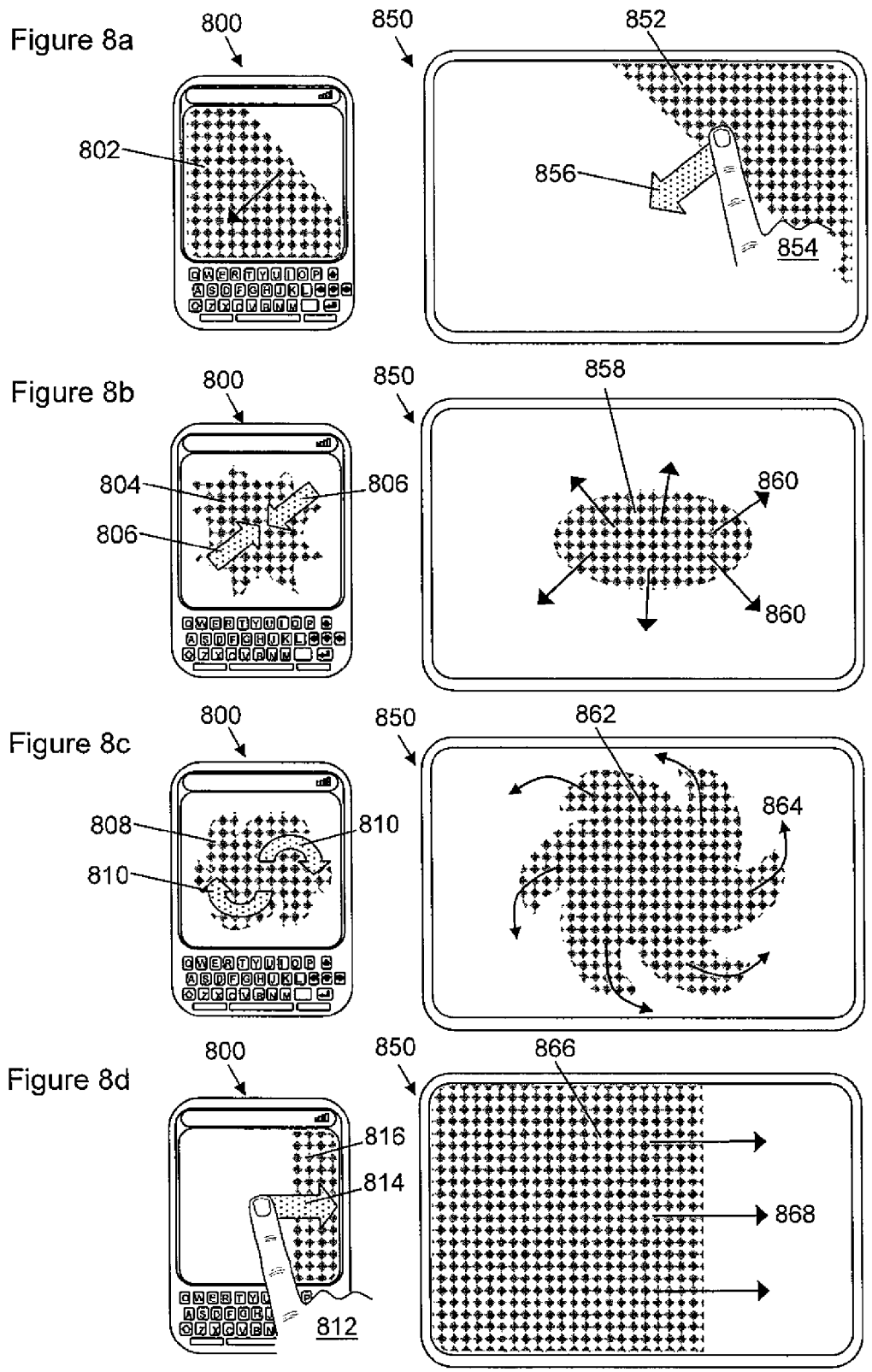

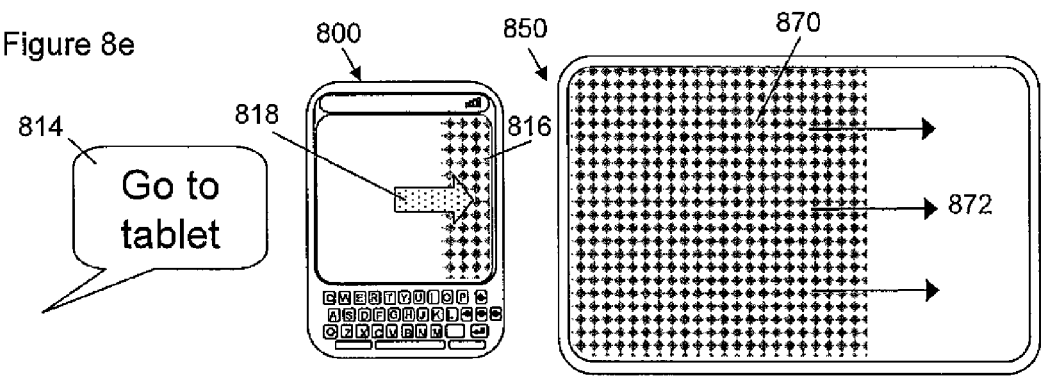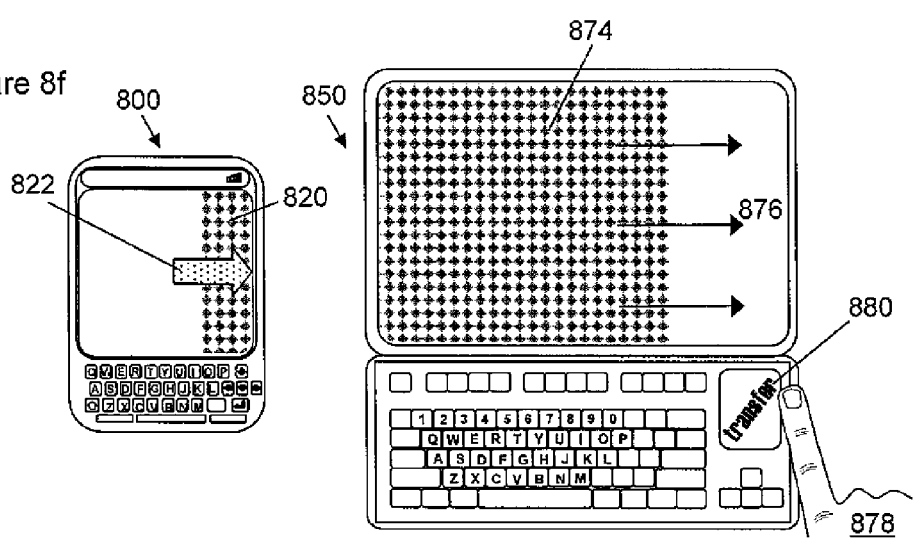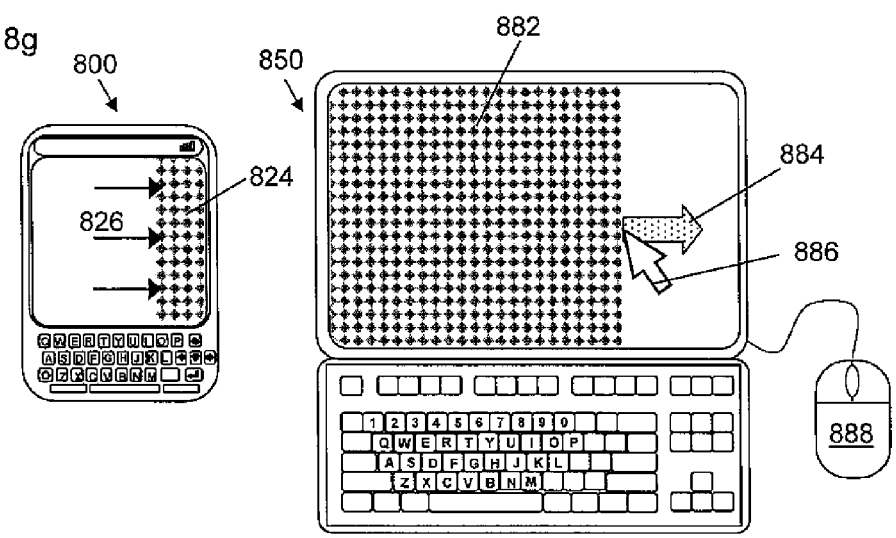

PROVISION OF AN OPEN INSTANCE OF AN APPLICATION

TECHNICAL FIELD

The present disclosure relates to the field of user interfaces, associated methods, computer programs and apparatus. Certain disclosed aspects/embodiments relate to portable electronic devices, for example so-called hand-portable electronic devices which may be hand-held in use (although they may be placed in a cradle in use). Such hand-portable electronic devices include so-called Personal Digital Assistants (PDAs), mobile phones, smartphones and tablet PCs.

BACKGROUND

Electronic apparatus and electronic devices are often configured to run one or more applications. The same application may be run on different apparatus/devices, possibly at the same time. There may be equivalent applications which have substantially the same functionality, and which may also run on different apparatus/devices. Further, other applications may share some common functionality while each also having functionality not in common with another application.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus comprising at least one processor; and at least one memory including computer program code, the at least one memory and the computer program code configured to, with the at least one processor, cause the apparatus to perform at least the following: receive a user input; and based on the user input, provide an open instance of a first application on a first device as a corresponding open instance of at least a related application on a second device. For example, a user input may cause an open application on a second device to appear, having a similar appearance to an open application on a first device.

The user input may be received by the first device, or by the second device.

The apparatus may be configured such that the open instance of a first application may be progressively removed from display from the first device and the corresponding open instance of the at least a related application may be progressively displayed on the second device based on the user input.

The apparatus may be configured such that the corresponding open instance of the at least a related application may be progressively displayed on the second device in a direction corresponding to a direction of the user input received at the first or at the second device. For example, a user may slide a finger from left to right (on the first or the second device), and the user may be presented with an application apparently sliding off the right side of the first device and onto the screen of a second device from the left.

The apparatus may be configured such that the proportion of the corresponding open instance of the at least a related application may be progressively displayed on the second device based on at least a characteristic of the user input.

The apparatus may be configured such that the proportion of the open instance of the first application may be progressively removed from display on the first device and the proportion of the corresponding open instance of the at least a related application may be correspondingly progressively displayed on the second device based on the at least a characteristic of the user input.

The characteristic of the user input may comprise: the direction of the user input, the speed of the user input, and the reversal of the user input. For example, the speed with which a user provides a user input may be reflected in the speed at which the apparent transition of an application from a first to a second device takes place. In such a case, the characteristic may be considered to be a speed-dependent characteristic. The characteristic could be a direction characteristic such that, for example, a user input on the first device in an upwards direction appears to show the open instance of the application leaving the top of the screen of the first device, and provides the appearance of the corresponding instance from the bottom of a screen of the second device. The user may reverse the direction of a user input being made and the open instance of the application may follow the reversed direction of the input accordingly. That is to say, the user may be able to begin to perform an input such as a slide input, and change his/her mind and reverse the direction of the slide input to move the open instance of the application back onto the original device.

The characteristic of the user input may provide a proportion of the open instance of the first application on the first device and a proportion of the corresponding open instance of the at least a related application on the second device to be distributed between the two devices to provide a user perception that the same application/content is being transferred between devices. The respective proportions on the first device and the second device may correspond to a full representation of the content of the first application distributed between the two devices. For example, if the user provides a slide gesture one third of the way across the screen of one device, the apparent transition may be of an open instance of a first application being moved over by one third to a corresponding open instance of at least a related application, so that two thirds of the open instance are still displayed on the first device and one third of the corresponding open instance of the at least a related application is displayed on the second device. Overall, a full representation of the content of the first application is distributed between the two devices and displayed across the displays of the two devices, The apparatus may be configured such that the open instance of the first application may remain displayed on the first device after the corresponding open instance of the at least a related application is displayed on the second device. After the second application is opened on the second device, the first application may still be open on the first device. It may or may not be possible for a user to interact with this first application.

The user input may comprise swipe across a touch-sensitive region of the first device or the second device, the swipe beginning at one edge of the touch sensitive region of the apparatus. That is, the user may be able to slide a finger (or a stylus, or scriber etc.) from one edge or from outside one edge of a (touch sensitive) screen or region of one of the devices in order to provide the user input.

The user input may comprise a swirl gesture detected by a touch-sensitive region of the first device or the second device. Such a swirl gesture may be thought of as providing a whirlpool effect, by the user moving, for example, their finger (or a stylus, or scriber etc.) around in a spiral, arcuate or circular motion on a (touch sensitive) screen in order to provide the user input.

The user input may comprise a voice input detected by the first device, the second device or another device. The user may be able to provide a 'pull' type voice command such as "Come to smartphone", or provide a 'push' type voice command such as "Go to desktop". The user may be able to provide such a voice command to the first device, the second device, or to another device such as a microphone or other peripheral device with audio input capabilities which is in communication with at least one of the first and second devices.

The user input may comprise a combination of one or more of the following gestures made on a touch sensitive display associated with the apparatus or first device or second device: a slide, a slide from one edge of a display, a tap, a multiple tap, a press, a flick, a pinch gesture, and a swirl gesture.

The apparatus may be configured to receive the user input via one or more of: a wand, a pointing stick, a touchpad, a touch-screen, a stylus and pad, a mouse, a physical keyboard, a virtual keyboard, a joystick, a remote controller, a button, a microphone, a motion detector, a position detector, a scriber and an accelerometer.

The apparatus may be configured to provide a corresponding open instance by providing one or more of the same data content as on the first application on the first device in the at least related application on the second device. Data content may be considered to be persistent data, in that this content is normally saved and available each time an application is opened.

The apparatus may be configured to provide a corresponding open instance by providing one or more of the same transient content as on the first application on the first device in the at least related application on the second device. Transient content may be considered as content and/or data which is not persistent, and which would not normally be saved (except in particular exceptional circumstances such as data recovery after a system failure), and may not be available between instances of openings an application.

The first application and the at least related application may be provided for use on the respective first and second devices by accessing respective one or more memories located with the first and second devices. Each device may store applications on their respective memories.

The first application and the at least related application may provide a common level of functionality which may be provided in the respective open instances of the first and the at least related application. The two applications may allow common tasks to be performed, for example, both applications may allow for text editing.

The first application and the at least related application may provide a common level of functionality which may be provided in the respective open instances of the first and the at least related application using the same operating system of the respective first and second devices. The first application and the at least related application may provide a common level of functionality which may be provided in the respective open instances of the first and the at least related application using different operating systems of the respective first and second devices. Each device may have the same, or different, operating systems, and have available applications with a common level of functionality, in that the same tasks may be performed using either application.

The first application and the at least related application may be equivalent applications provided using the same operating system of the respective first and second devices. The first application and the at least related application may be equivalent applications provided using different operating systems of the respective first and second devices. Each device may have the same, or different, operating systems, and have available equivalent applications. Two equivalent applications may be, for example, two word processing packages produced by different organisations, but which provide essentially the same functionality, e.g. allow a user to perform the same tasks in a similar way (even with a different user interface) regardless of which application he chooses to use.

The first application and the at least related application may be provided for use on the respective first and second devices by communication with at least one remote server. Thus, the first and second devices may require communication with at least one remote server to provide for use of the respective first and the at least related application.

The first application and the at least related application may be the same application provided for use on the respective first and second devices by communication with at least one remote server. For example, the same application may be the e-mail client Outlook, which is stored on a remote server, and the first and second devices may be able to communicate with the server in order to use the Outlook application.

The first and second devices may be independently operable to provide the functionality of the first application and the at least related application. Independently operable devices may be used without connection to another device.

The first and second devices may be configured to independently run a plurality of applications providing respective functionalities. Each device may have different applications available with different functionalities.

The data content may comprise one or more of: text, numbers, fields, cells, image content, audio content, video content, and webpage content. Data content does not include the user interface functionality provided by a particular application, such as window titles, buttons, icons and menus; such elements would be available in the shell of an application and allow for the user to make use of the functionality of the specific application.

The transient content may comprise one or more of: a pointer position, a cursor position, a zoom factor, a location on a page, a window size, a position in an audio or video file, a window form factor, a location of a window on a display, toolbar settings, and a highlighted element.

The open instance of a first application provided (for example, displayed) on the first device may have substantially a different appearance to the corresponding open instance of at least a related application displayed on the second device. The two applications, even if providing a common level of functionality, may appear differently. Also, if running on devices with different operating systems or on different versions of the same software/application, the two applications may appear differently.

The apparatus may be a portable electronic device, a laptop computer, a mobile phone, a Smartphone, a tablet computer, a personal digital assistant, a digital camera, a watch, a non-portable electronic device, a desktop computer, a monitor, a server, or a module/circuitry for one or more of the same.

A display of the first device and a display of the second device may each have one or more of: different display sizes, different display form factors, different display resolutions, and different display colour schemes, and the apparatus may be configured to consider these different aspects in the provision of the corresponding open instance on the second device.

The first device and the second device may be communicatively linked by a combination of one or more of: an infra-red connection, a Bluetooth connection, a wireless connection, a radio frequency identification (RFID) connection, a telephonic connection, a physical wired connection, a network connection, and manually.

The communicative link between the first device and the second device may allow for the transient content associated with the first open instance of a first application to be provided from the first device to the second device. That is, the apparent transfer (the appearance of "moving") of the application from one device to another may be via a communicative link, as above.

In a further aspect there is provided a method, the method comprising receiving a user input; and based on the user input, providing an open instance of a first application on a first device as a corresponding open instance of at least a related application on a second device.

In a further aspect there is provided a computer readable medium comprising computer program code stored thereon, the computer readable medium and computer program code being configured to, when run on at least one processor, perform at least the following: receive a user input; and based on the user input, provide an open instance of a first application on a first device as a corresponding open instance of at least a related application on a second device.

In a further aspect there is provided an apparatus, the apparatus comprising means for receiving a user input; and means for providing, based on the user input, an open instance of a first application on a first device as a corresponding open instance of at least a related application on a second device.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIG. 1 illustrates an example apparatus according to the present disclosure;

FIG. 2 illustrates another example apparatus according to the present disclosure;

FIG. 3 illustrates a further example apparatus according to the present disclosure;

FIGS. 8a-8g illustrate different ways in which an open instance of an application may move from one apparatus/device to another apparatus/device;

DESCRIPTION OF EXAMPLE ASPECTS/EXAMPLES

Figure 4A:
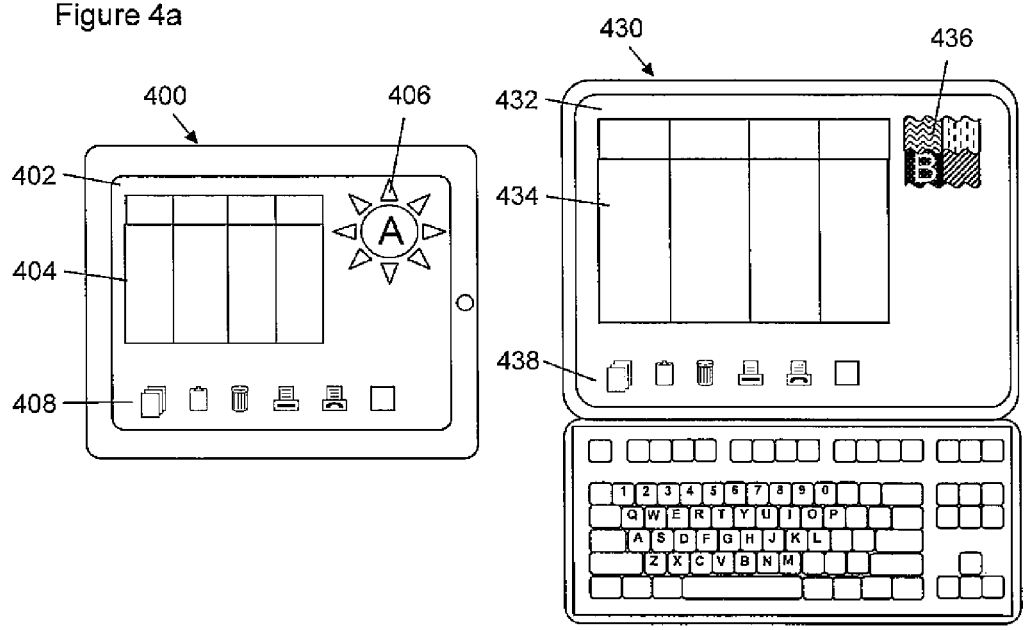
FIGS. 4a-4b illustrate applications running on apparatus/devices with different, and with the same, operating systems.

Electronic apparatus/devices are often configured to run one or more applications. The same application may be run on different apparatus/devices, possibly at the same time. For example, an office may contain several desktop computers which may all run the same word processing application at the same time. The application may be stored on a remote server and accessed by the different apparatus/devices, or the application may be locally stored for use on each individual desktop computer.

In another case, there may be equivalent applications which have substantially the same functionality, and which may also run on different apparatus/devices. Such equivalent applications may, for example, be the word processing applications Microsoft Word, WordPerfect, and Open Office Writer. These three applications can be considered to be equivalent in the sense that they provide a user with substantially the same functionality, but they are in fact different word processing applications.

Further, other applications may share some common functionality while each also having functionality not in common with another application. For example, a spreadsheet application and a data plotting application may be considered to share common functionality. These two applications share some common functionality (for example, being able to organise data in a tabular/cellular format) but each may have their own functionality which is not shared. For example, the spreadsheet application may allow more advanced text-based reports to be generated and the data plotting application may not allow this functionality, but the data plotting application may allow a user to plot data in a more advanced way, for example using mathematical functions and statistical analysis, but the spreadsheet application may not allow this functionality.

It may be beneficial to a user of such apparatus/devices to be able to perform tasks in one application, or in different applications, using more than one apparatus/device. For example, a user may be provided with data in a spreadsheet and wish to plot sophisticated graphs using that data in a data plotting application. As another example, a user may receive an e-mail on his or her smartphone, and wish to compose a reply to that e-mail using a laptop computer or a tablet PC as they may find it easier to type on a larger keyboard than using the keyboard available on the smartphone. As another example, a user may take a photograph using the camera built into his mobile phone, but may wish to manipulate the image using a photo editing application on his tablet PC, laptop, or desktop computer.

It may also be beneficial for a user not only to be able to perform a task in more than one application on different devices, but to have an easy and intuitive way of transferring the task which is open or currently being performed from one application to another. This may involve closing one application and opening another application in order to continue the task being performed. However, in doing this, it may be imagined that some information is lost due to the transfer. In the example of moving a word processing task from one application/device to another application/device, information which would be usually lost during the transfer may include the position of the text cursor (caret) in the text, the zoom settings, the page number being viewed, and the font settings enabled (e.g. bold, italic, strikethrough) for the next character input. In the example of transferring the task of browsing an internet site containing video content, information lost on transferring the task from one application/device to another application/device may include the position on the webpage being displayed, the zoom factor, the resolution of the video, the position in the video where the user was viewing (e.g. 20 seconds into a 1 minute clip) and the audio settings (e.g. volume). It may provide a benefit to the user if such data (so-called transient content) were preserved between task transfers.

It may also provide a benefit to a user of multiple devices if there was a relatively easy and intuitive way to transfer an open instance of an application (which can perform at least one task) from one device/application to another device/application. For instance, closing the first application on the first device, and then opening a second, equivalent, application on a second device, may be considered to be cumbersome for a user. If the user were able to, for example, perform a gesture on the touch sensitive screen of one device to transfer the open instance of the application to the second device and then recommence working on the same task/application in the second application/device, then the user may experience a smoother and simpler way of transferring tasks performed using applications between devices.

Aspects of the current disclosure may be considered to provide features of apparatus which may receive a user input; and based on the user input, provide an open instance of a first application on a first device as a corresponding open instance of at least a related application on a second device, and may provide at least some of the benefits outlined above.

FIG. 1 shows an apparatus 100 comprising a processor 110, memory 120, input I and output O. In this embodiment only one processor and one memory are shown but it will be appreciated that other embodiments may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signaling to the apparatus 100 from further components. The output O allows for onward provision of signaling from the apparatus 100 to further components. In this embodiment the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signaling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this embodiment the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other embodiments, one or more or all of the components may be located separately (for example, throughout a portable electronic device such as devices 200, 300, or through a "cloud", and/or may provide/support other functionality.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as, a Liquid Crystal Display (LCD), e-Ink, or touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Device/apparatus 300 shown in FIG. 3 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 380 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signaling to, and receiving signaling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

Figure 4B:
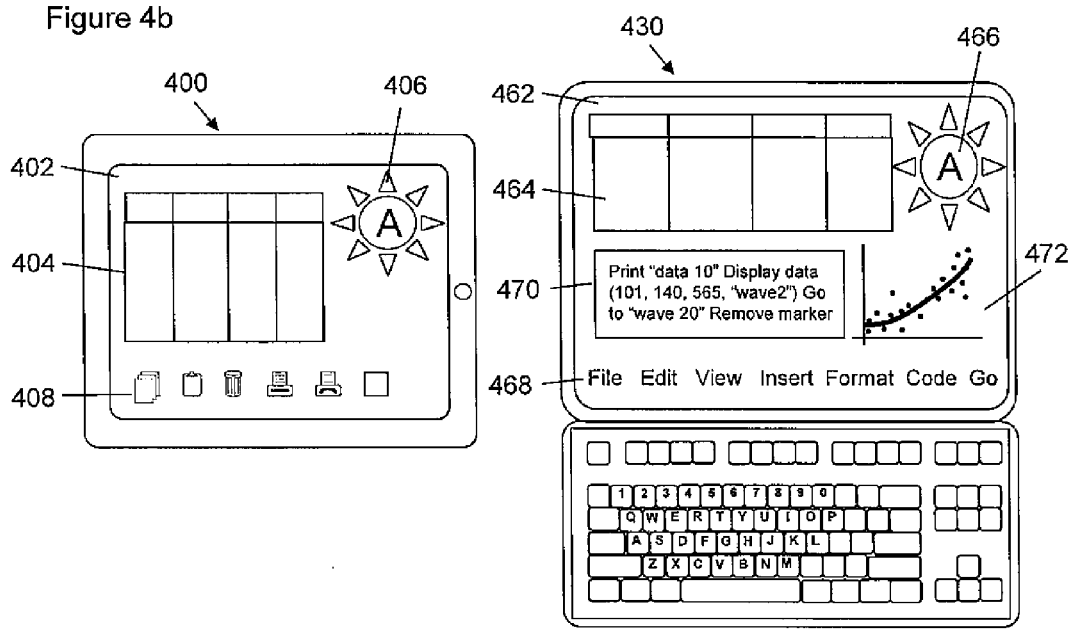

FIGS. 4a-4b illustrate an example embodiment of two apparatus (devices) in use: a portable electronic device such as a tablet PC 400, and a desktop or laptop computer 430. The devices 400, 430 in these examples are each running an application 402, 432, 462 which allows the manipulation of data in a spreadsheet 404, 434, 464.

FIG. 4a shows a first device 400 using operating system "A" 406 and running an application 402 which is a spreadsheet 404 application having particular functionality, as indicated by the respective icons 408 (e.g. new worksheet, clipboard, delete, print, send). A second device 430 uses a different operating system "B" 436, but is also running an application 432 which is an equivalent spreadsheet 434 application to that running on first device 400. The same particular functionality is available on the two applications 402, 432 running on the first device 400 and second device 430, as indicated by the respective icons 408, 438 illustrating the equivalence of the two applications 402, 432.

Because the first 402 and second 432 applications both provide substantially similar functionality, they are equivalent applications 402, 432 provided using different operating systems 406, 436 of the respective first 400 and second 430 devices. It will be appreciated that the two devices 400, 430, could be using the same operating system, "A" 406, "B" 436, or another operating system, and an equivalent application could be run on each device in this case also.

The second application 432 may be considered "at least related" to the first application 402 on the basis that the first and second applications are either equivalent (i.e. they provide substantially similar functionality), or identical. The two applications may be identical in the sense that they are different instances of the same application, or may be identical in the sense that they are the same instance of an application, with that single instance having been transferred from the first device 400 to the second device 430.

Consider a further example, as shown in FIG. 4b, which again shows a first device 400 using operating system "A" 406 and running an application 402 which is a spreadsheet 404 application having particular functionality, as indicated by the respective icons 408. However, in this case, the second device 430 uses the same operating system "A" 466. The second device 430 is running an application 462 with a common level of functionality as that provided by the application 402 running on the first device 400. The common level of functionality in this example is that a spreadsheet 464 may be used on the second device 430, and a spreadsheet 404 may be used on the first device 400. The common functionality may also be considered to be any menu options 408, 468 with the same common functionality. For example, the application 462 may also allow for the functionality to open a so new worksheet, use a clipboard, delete, print, and send data, and such functionality may be accessed through the text-based menus 468 rather than the icon based options 408 of application 402. Thus, the menu options may have different representations in each application 402, 462, as shown by the icon-based options 408 and the text-based menu options 468.

However, the application 462 running on the second device 430 has additional functionality to the application 402 running on the first device 400. For example, the application 462 may be a data manipulation application which allows not only spreadsheet 464 use, but also may allow a user to manipulate data using command line type inputs 470, different menu/icon functionality 468, and may allow different output such as graphical representations of data 472. Of course, the application 402 may also allow functionality which is not available in the second application 462, such as financial report generation, for example. In this example, the open instance of the first application 402 displayed on the first device 400 has substantially a different appearance to the corresponding open instance of the at least related (second) application 462 displayed on the second device 430. The appearance is shown in FIG. 4b as being different in the second application 462 to the first application 402, in that there are different elements displayed in the second application, such as the command line input area 470, the file/menu options 468, and the graphical display 472. It will be appreciated that there are many other ways in which the appearance may be different between two open instances of two applications, such as having different colour schemes, different fonts, different display sizes and form factors, different style buttons/icons/menu systems, and many other possible factors.

Therefore the first application 402 and the at least related second application 462 provide a common level of functionality which is provided in the respective open instances of the first 402 and the at least related 462 application, in this case using the same operating system "A" 406, 466. It will be appreciated that the two devices 400, 430, could be using different operating systems, and applications providing a common level of functionality could still be run on each device in this case.

The first 400 and second 430 devices in FIGS. 4a and 4b are independently operable; that is, they can be used as standalone devices without connection to another device, such as a server, and provide the functionality of the first application 402 and the at least related (second) application 432, 462.

Figure 5:
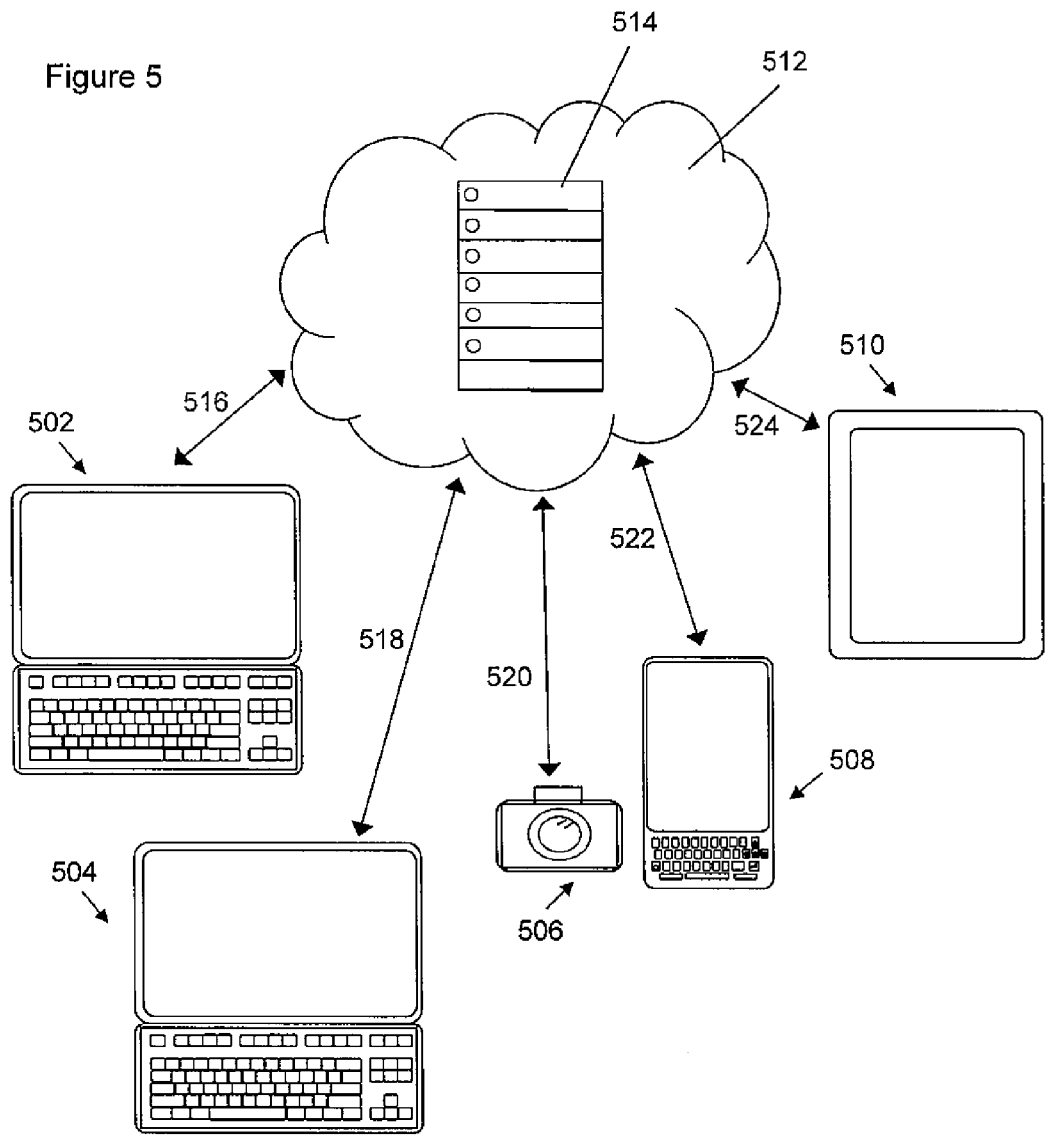
FIG. 5 illustrates a number of apparatus/devices in communication with a server.

FIG. 5 illustrates an example embodiment of several apparatus (devices) in communication with an external remote, server. The illustrated devices include two laptop or desktop computers 502, 504, a digital camera 506, a smartphone/mobile phone/PDA 508 and a tablet PC 510. Any number of devices may be in communication with the remote server 512, 514, here shown as a cloud 512, but which may be a physical server 514. The communication 516, 518, 520, 522, 524 with the remote server 512, 514 is two way communication for each device. Each device 502, 504, 506, 508, 510 may be capable of running one or more applications.

Related applications may be provided for use on various different devices 502, 504, 506, 508, 510 by communication 516, 518, 520, 522, 524 with the remote server 512, 514. That is, an image processing application may be available from the server 512, 514, and different versions of this image processing software may be available, each version being more suited for use on a particular device. For example, a version with a relatively large functionality may be suitable for use on a laptop or desktop computer, a version with reduced functionality may be suitable for use on a mobile phone or smartphone, and a version with particular functionality suitable for use on a digital camera may also be available.

As another example, the same application may be provided for use on various different devices 502, 504, 506, 508, 510 by communication 516, 518, 520, 522, 524 with the remote server 512, 514. The same application may be, for example, a mini-game, a text-message editor, or a social media application (many more are possible). Thus, the applications are not located locally just on the respective devices, but may need to communicate with the remote server in order to run the application. In certain embodiments, the application can be considered to be distributed between the device and the server, with parts of the application on the respective device/server needing to be run together to perform the tasks provided by the application.

The server may provide, for example, the same or related applications, for use by allowing for download of the application from the server, so that after the download, the device can run the stored application as a stand-alone device, without further communication with the server. The device may also be able to communicate further with the server, for example to download and store an updated version of the application. Provided for use may also be taken to mean that the application is stored and running on the remote server, and that the devices provided with that application for use are using that application which is running on the server. In this case, a user of the device may not be able to use the application if communication with the server is interrupted or terminated. In other examples, there may be more than one remote server, with which one or more devices is/are in communication.

FIGS. 6a-6f illustrate an example embodiment of three apparatus (devices) in use: a portable electronic device such as a tablet PC 600, a desktop or laptop computer 630, and a smartphone/mobile phone/PDA 660. The devices 600, 630, 660 in these examples are each able to run a map application, and a user is able to make a user input to provide an open instance of a first map application on a first device 600, as a corresponding open instance of at least a related (map) application on a second device 630. In this example, the user is also able to make a second user input to provide the second open instance of the second map application on the second device 630 as a corresponding open instance of at least a related (map) application on a third device 660. The three devices 600, 630, 660 may be independently operable, that is, for example, the tablet PC 600 may not necessarily require any connection to another device or to the internet or other network in order to operate (although such connections to other devices and/or to a network and/or the internet may be possible, and would be useful to provide the corresponding open instance functionality described herein). The three devices may also each be able to run a plurality of applications each providing respective functionalities, and not only be able to run a map application. In other examples, it may be that a particular device, such as an in-car navigation system, is only able to run one application, such as a GPS navigation/map application.

Figure 6A:
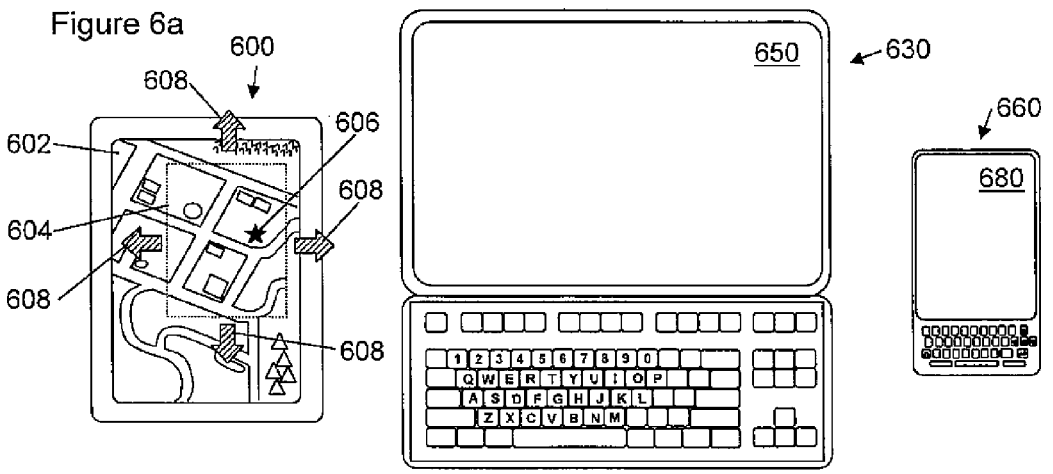
FIGS. 6a-6f illustrate an open instance of a map application being moved across three different apparatus/devices.

FIG. 6a shows a first device such as a tablet PC 600 displaying an open instance of a first application 602, in this example, a map application. In FIG. 6a, a user decides to zoom 608 into a region of the displayed map which contains a user marker 606. This user marker may be, for example, the current location of the user (if the device comprises GPS location capabilities). As another example, the user marker 606 may be a flag positioned manually by the user to indicate a particular spot, such as a friend's house, restaurant, or landmark. The particular spot may also have been marked by a user as the start or end of a planned journey.

This marker is a temporary indicator on the map, and if the map application 602 were to be closed, it can be imagined that this marker may be lost (unless it is formally first saved as data content together with the other data content such as the map details). This marker may be considered to be transient content. Similarly, the zoomed area may be considered transient content, since if the map application is closed, it can be imagined that upon re-opening the map application, the particular zoomed-in area 604 will not be retrieved and the user would have to re-perform the zoom the display the area 604 again. Transient data such as the zoom factor, and the user marker, may be thought of as data which is not normally saved upon an application being closed, that is, transient data would not normally persist between instances of an application being opened.

Other examples of transient data may include the position of a mouse pointer on a display; the position of a text cursor in a region of text; the location on the page currently being displayed in e.g. a text document, spreadsheet, website, or map; the size of a window on a display; the position in an audio or video file (for example, 15 minutes into a 2 hour movie) the form factor of a displayed window or area (relative dimensions), the location of a window on a display (e.g. a window shown in the top right corner or a display screen), a toolbar setting (such as selecting a text format (e.g. 'bold', 'italic', 'strikethrough', 'underlined'), a text justification (left, central, right, justified), or font style (point size, font colour, font type)) or a highlighted element (such as a string of characters highlighted in a text document, a cell or cells highlighted in a spreadsheet, or a contact highlighted in a contacts list). It will be appreciated that these transient contents are usually lost upon an application being formally closed, and will need to be re-defined by the user when the application is opened again.

The map displayed in the open application 602 also shows other features such as the actual map elements displayed as images (roads, buildings, forests etc.) These map elements form data content. Data content may be considered persistent, in that it will always be available to a user upon the user opening the application. The map application itself may also display elements such as menus and buttons/icons and such elements would not be considered to be data content. Each time the map application is opened, the map elements, menus, buttons and text will be presented and/or available to the user regardless of which map was open of being viewed, or indeed, possibly even if no map was currently open for viewing. Also, different map applications may have different menus and/or buttons/icons and may still allow the user to view the same data content i.e. the same map with its map elements.

Other examples of data content include text (such as text saved in a word processing document, e-mail, database, text-based message or contacts list); numbers (such as entries made in a spreadsheet, database or data package, or contacts list); fields (such as entries made in a database, text entered into a field in a website); cells (such as spreadsheet entries); image content (such a photographs, maps, drawings, presentation slide content, and images in games); audio content (such as music, songs, voice recordings and game soundtracks); video content (such as video cuts in games, and movies); and webpage content (text, images and hyperlinks). It will be appreciated that this list of examples is not exhaustive. It will also be appreciated that, upon opening a previously closed application, such data content is usually presented and/or available to the user.

Figure 6B:
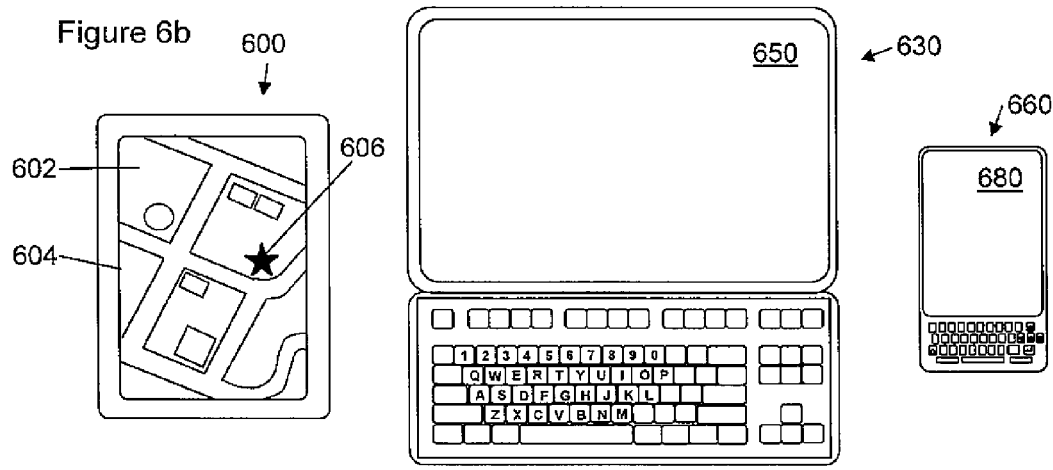

FIG. 6b shows the zoomed area 604 of the map selected in the map application 602 in FIG. 6a, including the user marker 606. At this point device 630 and device 660 do not show any open applications on their respective displays 650, 680. It may be that there is no map application currently opened on these devices. Also, there may be a map application open, but it is 'minimised' or hidden so that although it is running, it is not currently displayed. In any case the devices 630, 660, have a map application available for use. The map applications of devices 630, 660, are at least related to the map application of device 600, in that they may be the same application (for example, all three devices 600, 630, 660 may have the same map application) or they may have map applications with a common level of functionality (for example, the map application 602 of device 600 may be one particular map application, whereas device 630 may have a different map application and device 660 may have two other map applications. These applications all have a common level of functionality.)

In this example, the map applications are provided for use on devices 600, 630, 660 by accessing the respective memories located with each device. For example, the first map application 602 is located on a first memory (not shown) located with the first device 600, the second map application 638 is located on a second memory (not shown) located with the second device, and the third map application 638 is located on a third memory (not shown) located with the third device.

Figure 6C:
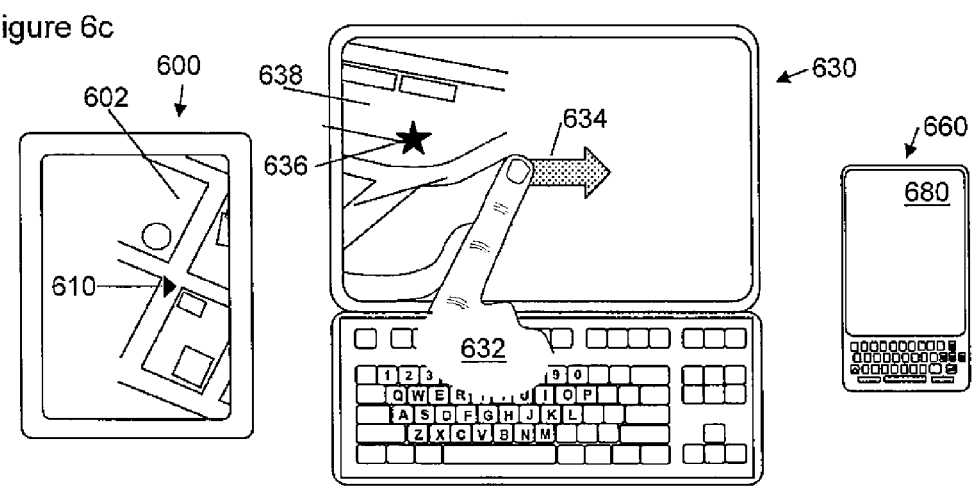

In FIG. 6c, a user 632 is providing a user input 634 which is being received by the second device. In this example the user is providing a slide gesture to the touch-sensitive screen of the computer 630. Other user inputs may be used in place of the slide gesture, and some examples of suitable user inputs are described in more detail in relation to FIG. 8.

Figure 6D:
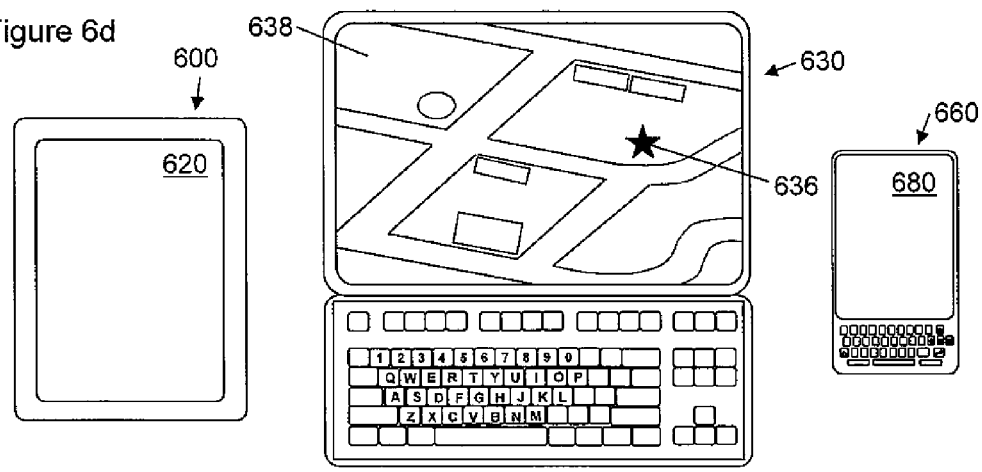

Based on this user input 634, as shown in FIG. 6d, the open instance of the map application 602 of the first device 600 is provided as a corresponding open instance 638 of at least a related (map) application on the second device 630. That is, due to the user input 632, the map application 602 which was open on the first device 600 now appears as an open instance of the map application 638 on the second device 630. In this example, the same data content (map features) and the same transient content (zoom factor, user marker 636) are provided on the second device 630 as were provided in the first application 602 on the first device 600.

In this example shown in FIG. 6c, the open instance of the first application 602 is progressively removed from the display of the first device, and the corresponding open instance of the second (at least related) application 638 is progressively displayed on the second device as the user moves his/her finger progressively from the left to the right. The progressive removal/display occurs in this example in the direction of the user input; that is, the user is sliding his finger 634 from left to right and the apparent transition of the open instance of the application from the first device on the left to the second device to the right is in the same direction, left to right. The term "apparent transition" is used because, in this example, the open instance of the first application is not actually moved from the first to the second device. The transient content and the data content are synchronised between the two devices 600, 630, and the open instance of the second application on the second device is configured to use the transient content and data content to display an application to the user which shows common features to that seen on the first device before the user input. In this example, it may be considered that the local state (including the transient content and the data content) is replicated on the second device as in the first device, giving the appearance that the open instance of the first application has been transferred as the open instance of the second application.

It can also be seen that the difference in form factor is accounted for in this example. The form factor of the displays of device 600 and device 630 are different, and so the form factor of the displayed content is altered accordingly so that the open instance of the first application 602 displayed on the first device 600 displays the same area of the map (the zoomed area 604) as the open instance of the application displayed on the second device 630.

It will be appreciated that in other examples, the form factor of the displayed open application may not be preserved upon displaying another open instance of a user application, and the form factor may be chosen to best suit the data being displayed. For example, video shown in widescreen display on a landscape-oriented monitor of a laptop may maintain the form factor of the widescreen if subsequently opened on a mobile telephone with a portrait-oriented screen; the other regions of the mobile phone screen not showing the video may be black or contain other options or text. Rotating the mobile phone so that the display is landscape oriented may cause the movie to be rotated correspondingly and displayed in landscape on the landscape oriented display of the mobile phone.

The two devices 600 and 630 not only have different form factors, but also have different display sizes. The open instance of the second application on the second device is resized in comparison with the open instance of the first application on the first device, to accommodate the larger screen of the second device with respect to the first device. The two devices 600, 630, may also have different display resolutions and/or different display colour schemes (for example, one device may have a black and white screen, and another device may have a colour screen).

The apparent transition of the map being progressively removed from display from the first device 600 and progressively displayed on the second device 630 may be dependent on a speed-dependent characteristic of the user input 634. It may be envisaged that if the user makes a faster slide gesture 634, that the apparent transition would be relatively faster. Similarly, if the user were to make a relatively slow slide gesture 634, then the apparent transition may be relatively slower. Also, for example, the user may be able to begin to make a slide gesture, then (say, if they changed their mind about wanting to make the transition) they could reverse their input and move the open instance of the application back on to the original device.

Figure 6E:
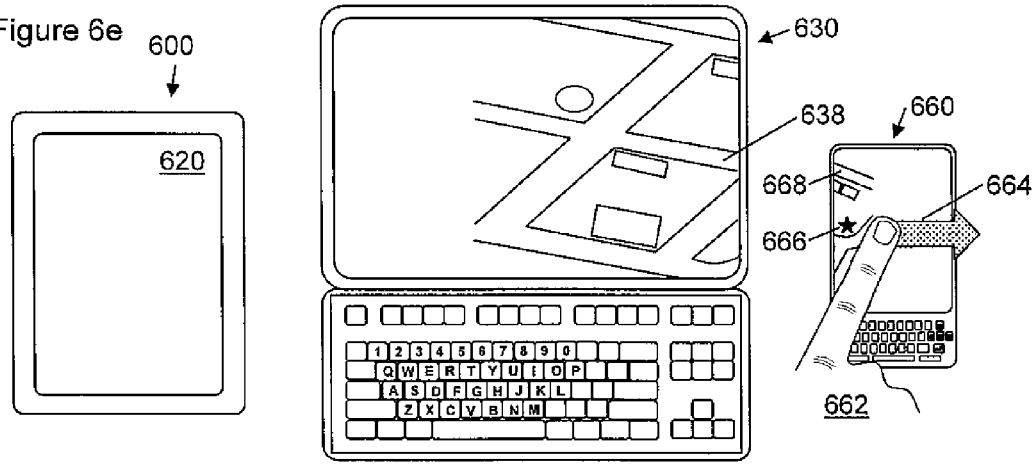

The provision of open instances of user applications is not limited to being between two devices only. FIG. 6e shows a user 662 providing a user input 664 which is being received by the third device 660. Again the user is providing a slide gesture 664 to the touch-sensitive screen of the mobile phone/smartphone/PDA 660 (but other user inputs are possible).

Figure 6F:
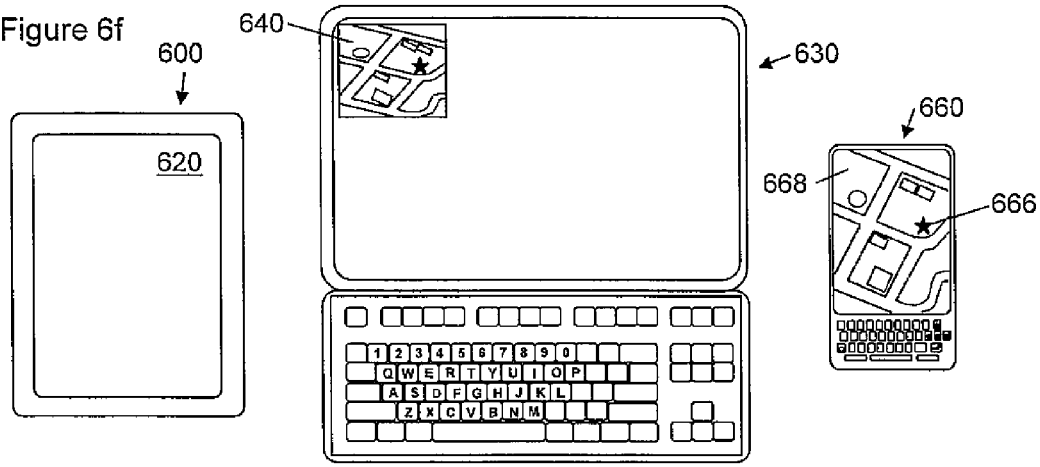

Based on this user input 664 the open instance of the map application 638 of the second device 630 is provided as a corresponding open instance 668 of at least a related (map) application on the second device 660. As shown in FIG. 6f, due to the user input 664, the map application 638 which was open on the second device 630 now appears as an open instance of the map application 668 on the third device 660. Again in this embodiment, the same data content (map features) and the same transient content (zoom factor, user marker 636) are provided on the third device 660 as were provided in the second application 638 of the second device 630 and in the first application 602 on the first device 600. The user need not zoom in again, or insert any new user markers 666 after the user input, as this transient content has been preserved during the transition.

Note that in the example shown in FIG. 6f, the open instance of the second application 638 remains displayed 640 on the second device 630 after the corresponding open instance of the map application 668 is displayed on the third device 660. This remaining display 640 may be as an image, to remind the user what has been displayed on the second device 630 but which does not allow full interaction as previously. In other examples, the remaining display 640 may be the second application 638 which is still running and with which the user may still be able to fully interact. It will be appreciated that the application on the first/second device may close after the apparent transfer to the second/third device. Of course, they may remain open and be updated, synchronised with changes made on the device with which the user is interacting.

For example, it may be envisaged that while the user can make inputs and manipulate the open application 668 on the third device 660, he or she may also be able to make inputs and manipulate the open application 638 on the second device 630. Just because the open instance has been provided on a further device does not necessarily exclude the ability of the open application to still be running on the initial device. Any inputs made on the second device 630 may be received by the open instance of the application 638 on the second device 630; however, on-going synchronisation of the transient content of the applications on the second 630 and third 660 devices may mean that the effect of such inputs at the second device 630 is propagated into the application running on the third device 660. In such cases one of the devices, or a remote server, can act as a controller to control the synchronisation between the multiple devices, or more than one of the devices can act in cooperation to control the synchronisation.

In the above example, the gestures can be considered to be pull gestures, in that the corresponding open instance is seen to be pulled onto from the device which receives the gesture input. Of course, in other examples, the (gesture) input could be a push gesture input from a first device to provide the corresponding open instance on a second device.

It may be the case that two devices are configured to form a (e.g. private) sharing network to allow for the provision of corresponding open instances of at least a related application as described herein.

FIGS. 7a-7f illustrate another example embodiment of two apparatus (devices) in use: a portable electronic device such as a mobile phone, smartphone, or PDA 700, and a tablet PC 750. The devices 700, 750 in these examples are each able to run a text editing application, and may (otherwise) operate independently, that is, each may not require any connection to another device or to the internet or other network in order to operate (although such connections to other devices and/or to a network and/or the internet may be possible, and required to allow for the corresponding open instances of a related application). The two devices 700, 750 may also each be able to run a plurality of applications each providing respective functionalities. For example, the device 700 may have calling capabilities, be able to send/receive SMS, MMS and video messages, send/receive e-mails, play games, and access social media sites and applications. The device 750 may be able to run productivity applications (word processing, spreadsheets, databases, presentation applications) and image processing applications, and play games.

Figure 7A:
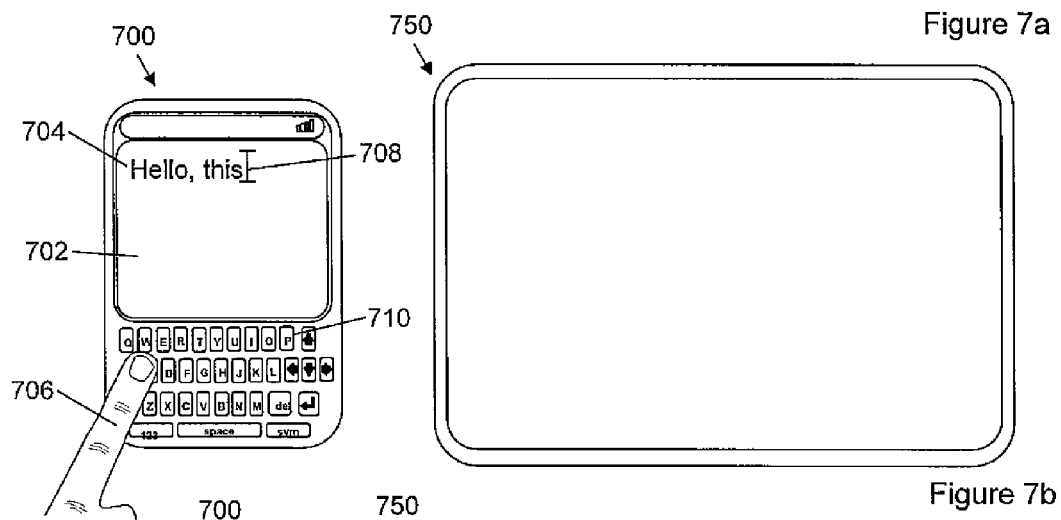
FIGS. 7a-7f illustrate another open instance of a text application being moved across two different apparatus/devices.

FIG. 7a shows a first device 700 displaying an open instance of a first application 702, in this example, a text editing application. In FIG. 7a, a user has started to type 706 the message "Hello, this" 704. The open instance of this application contains the transient content of the text cursor 708, which is the location in the body of the text where subsequent text input will be positioned. The user may decide that, rather than typing in the message on the device 700 which has a relatively small keyboard 710, that he would rather compose the message on his tablet PC 750. FIG. 7a shows that there are no open instances of any application displayed on the device 750. It may be that there are no applications currently running on device 750, or it may be that some applications (which may or may include a text editing application) are running but are minimised so they cannot currently be seen on the screen. In any case the devices 700, 750, have a text editing application available for use.

The text editing applications of devices 700, 750 are at least related, in that they may be the same application (for example, both devices 700, 750 may have the notepad-type text editing application) or they may have text editing applications with a common level of functionality (for example, the text application 702 of device 700 may be a relatively basic text editing application allowing the entering of plain text, whereas device 750 may have a more sophisticated text editing application such as Open Office Writer). It may be imagined that a device such as device 750 has more than one text editing application available for use, such as Open Office Writer, Notepad, and Pages. All these applications have a common level of functionality in that they can be used for editing text. In this example, the text editing applications are provided for use on devices 700, 750 by accessing the respective memories located with each device. It may be in other examples that one or more devices accesses the required software from a remote server or cloud.

Figure 7B:
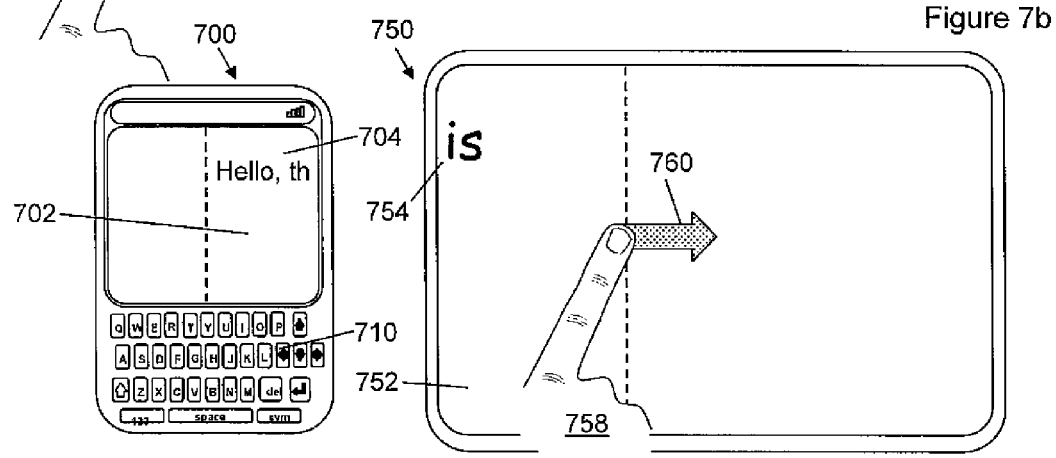

In FIG. 7b, a user 758 is providing a user input 760 which is being received by the second device 750. In this example the user is providing a slide gesture to the touch-sensitive screen of the tablet PC 750. Other user inputs may be used in place of the slide gesture, and some examples of suitable user inputs are described in more detail in relation to FIG. 8.

Figure 7C:
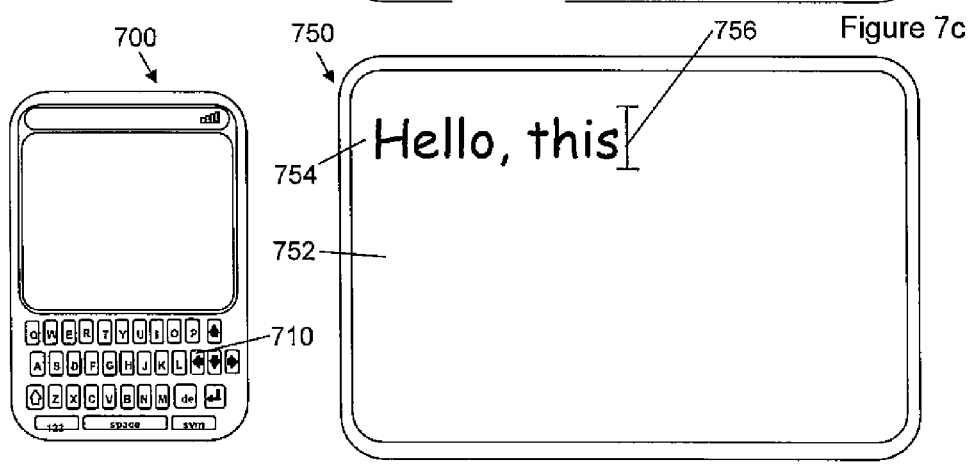

Based on this user input 758, as shown in FIGS. 7b and 7c, the open instance of the text editing application 702 of the first device 700 is provided as a corresponding open instance 752 of at least a related (text-editing) application on the second device 750. Due to the user input 758, the data content and transient content in the text editing application 702 which was open on the first device 700 now appears in an open instance of the text editing application 752 on the second device 750. The same data content (text "Hello, this" 704, 754) and the same transient content (text cursor 756 positioned after the "s" of "this") are provided on the second device 750 as were provided in the first application 702 on the first device 700.

FIG. 7c shows that the position of the transient content element, the text cursor 756, is preserved at the end of the text being composed 754 after the open instance of the second application is opened on the second device 750. Thus, the user need not be concerned with finding the position where the text cursor was the last time that the text file was edited; this transient content has been preserved. The text cursor need not necessarily be at the end of the input string; for example, a user could have last been editing the middle section of a document while correcting typographical errors or adding a section of text. This may be particularly useful if editing a larger document, and it will be appreciated that other transient characteristics such as the last viewed page, the position on the last viewed page, the last used font settings (bold, italics, case, etc.) may also be preserved and may aid the user in continuing the editing/composing of their text based message on the second device, as they will not have to re-determine this transient content upon re-opening the text file.

In this example shown in FIG. 7b, the open instance of the first application 702 is progressively removed from the display of the first device, and the corresponding open instance of the second application 752 is progressively displayed on the second device. The progressive removal/display occurs in the direction of the user input; that is, the user is sliding his finger from left to right and the apparent transition of the open instance of the application from the first device 700 on the left to the second device to the right 750 is in the same direction, left to right. Of course, the gesture input may be provided on the first device 700 by pressing a particular key, or by using the display if it allows for touch input.

In this example, the text is resized upon display in the open instance of the second application 752 on the second device, and the displayed font is different in the two applications 702, 752. Therefore in this example, while some of the data content (the text "Hello, this") and the transient content (the text cursor 756) are preserved upon the open instance of the second application being used, other data content (the font style and font size) are altered to match some preset property of the second device 750. In other examples, the font style and font size may be preserved upon viewing the data and transient contents in a second open instance of the application on a second device. The data content and transient content properties which are preserved, and the data content and transient content properties which are determined by the particular device being used, may be determined by the user as a preference setting.

The apparent transition of the text editing application being progressively removed from display from the first device 700 and progressively displayed on the second device 750 may be dependent on a speed dependent characteristic of the user input 758. It may be envisaged that if the user makes a faster slide gesture 760, that the apparent transitions would be relatively faster. Similarly, if the user were to make a relatively slow slide gesture 758, then the apparent transition may be relatively slower. The apparent transition may also, in other examples, be dependent on the extent of the user input provided to make the transition. For example, the user may begin to make a slide input to appear to progressively remove an open instance of a first application from a first device and progressively display a corresponding open instance of at least a related application on a second device. Part way through the full input (which may be, for example, sliding a finger from one edge to the opposing edge of a touch sensitive screen of one of the devices) the user may change his/her mind, and reverse the direction of the slide input to apparently move the open instance of the first application back onto the first device. The user may also be able to 'wag' their finger providing the slide input back and forth, with the apparent movement of the open instances of the applications following the 'wagging' back-and-forth motion.

Figure 7D:
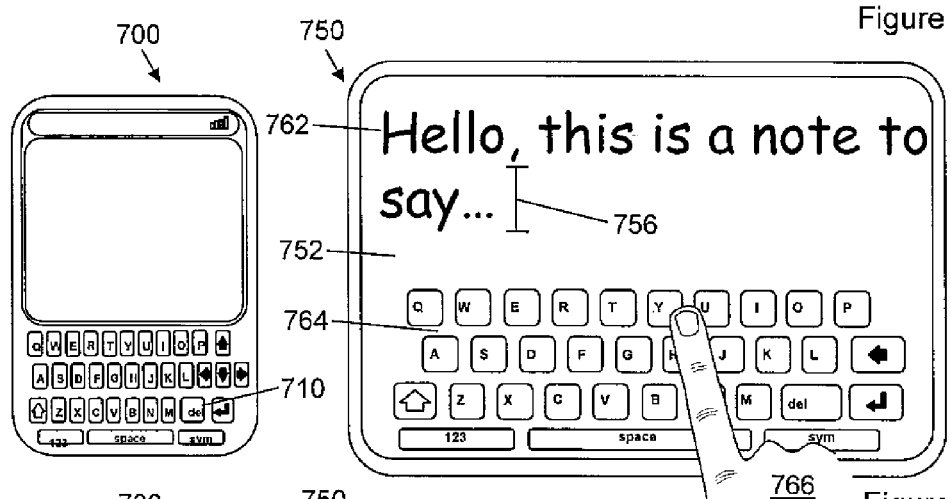

FIG. 7d shows that the user 766 has opened the virtual keyboard 764 of the tablet PC and has continued to compose the text message to now read "Hello, this is a note to say . . . " 762. A user may wish to continue composing a text message on another device if, for example, it is easier to type on the virtual keyboard 764 of a tablet PC 750 than on the smaller keyboard of the smartphone-type device 700. However, in this example, the user wishes to transmit this composed text as an SMS message to a contact stored in the contacts list of his smartphone-type device 700. The user therefore wishes to open the composed message 756 back on the first device 700 in order to transmit the message 756 to a contact.

Figure 7E:
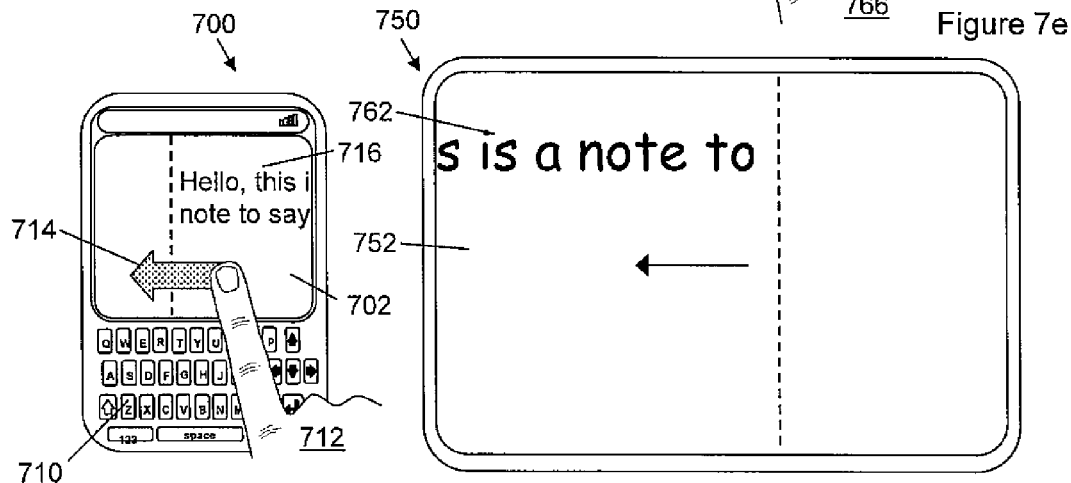

FIG. 7e shows that the user 712 is again providing a slide 714 user input so that the open instance of the application 752 (in this case the reference numeral 752 refers to the first application—not the second application as in the previous examples) is progressively removed from the display of device 750 (in this case, the reference numeral 750 refers to the first device, and not the second device as in the previous examples) on the right, and the corresponding open instance of the application 702 (in this case, the reference numeral 702 refers to the second application, and not the first application as in the previous examples) is progressively displayed on the device 700 (in this example, the reference numeral 700 refers to the second device, and not the first device as in the previous examples) on the left. The progressive removal/display occurs in the direction of the user input; that is, the user is sliding his finger from right to left, and the apparent transition of the open instance of the application 752 from the first device 750 on the right to the second device 700 (on the left 700 with respect to the device 750) is in the same direction, right to left. Of course, the corresponding open instance could be pushed over from the first device 750 onto the second device 700 (in contrast to the pulling embodiment shown in FIG. 7e).

Figure 7F:
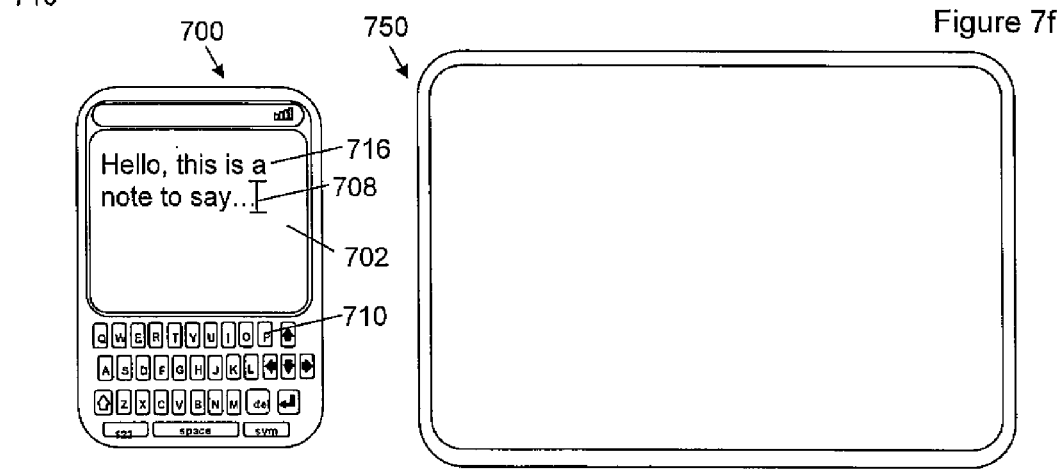

FIG. 7f illustrates that the message 716 which was composed on the device 750 is now available in an open instance of an application 702 on device 700. Device 700 may have features not available to device, such as, for example, being able to transmit SMS (and other types of) messages. The user therefore has the ability to perform the task of composing a message and transmitting that message to a contact using different devices, where each device may offer particular advantages over others, such as typing on the larger keyboard 764 of the tablet PC device 750, and transmitting the message to a contact stored in a contacts list 700 of the smartphone device 700. The ability of the apparatus to provide an open instance of a first application on a first device as a corresponding open instance of at least a related application on a second device, including the availability in the open instance of the at least related application of the data content (such as the text typed so far) and the transient content (such as the text cursor 708, 756 position) may allow for the user to experience a smoother and more seamless transition between using the two devices.

It may be envisaged in other examples that while the user can make inputs and manipulate the open application 752 on the tablet PC device 750, he or she may also be able to make inputs and manipulate the open application 702 still available on the first device 700. Although not shown in the figures, it may be that the text editing application may remain available and operable on the first device even after the related application is opened and in use on the second device.

The devices 700, 750 have different form factors in this example. This may be taken into account by the devices re-justifying the text so that the text is displayed from the left to the right of whichever display it is being displayed on. For example, on the device 700, the text "Hello, this is a" will fit across one line of the display (see FIG. 7*f*). However, on device 750, the text "Hello, this is a note to" will fit across one line of the display (see FIG. 7*d*). In other examples the applications may be configured so that identical justification of the text (and possibly other factors such as font size, font style, font colour etc.) is preserved between open instances of applications displaying the text regardless of the device characteristics.

FIGS. 8*a*-8*g* illustrate two exemplary devices 800, 850, and each FIG. 8*a*-8*g* represents a different way in which the open instance of a first application may be progressively removed from display from a first device 800 and a corresponding open instance of at least a related application may be progressively displayed on the second device 850. Of course, the corresponding instance may be provided instantly, rather than progressively linked with the progressive nature of a particular user input. Thus, pressing a key, for example, on the first device may instantly provide the corresponding open instance on the second device.

FIG. 8*a* shows that the user 854 is providing a slide gesture 856 in a diagonal direction from top right to bottom left of the screen of the second device 850. The open instance of the first application 802 is progressively removed from display from the first device 800 and the corresponding open instance of at least a related application 852 is progressively displayed on the second device 850. The user may, in other examples, provide a slide gesture in any direction, for example from left to right, right to left, diagonally, from top to bottom, or from bottom to top. The open instance of the at least a related application is progressively displayed on the second device 850 in a direction corresponding to the direction of the user input made. In other embodiments the direction could be inverse to the direction of user input, for example, a left to right input made on the first device (or on the second device) may display the corresponding instance from right to left on the second device. The direction of the user input can be an arbitrary direction which the user may select based on his or her observation of the relative position of the devices being used. Thus, in a case where the transitional effect from the open instance of a first application appearing to as a corresponding open instance of an at least related application is a directional one, the devices need not necessarily know their position relative to the other devices. As a further example, the user, when providing a slide gesture input in any direction, may change their mind and be able to reverse the direction of the slide to provide the open instance of the first application back on the original first device. The user may also be able to 'wag' their sliding finger back and forth and create the impression of the open instances of the first application and the at least related application wagging back and forth between the two devices.

FIG. 8*b* shows that that a user is providing a "pinch" gesture 806 on the screen of the first device 800. The open instance of the first application 804 is progressively removed from display from the first device 800 and may appear as if being pinched up, similarly to a cloth being pinched in the middle and being lifted up from a surface. The corresponding open instance of at least a related application 858 is progressively displayed on the second device 850, in this example as if pooling out 860 from the centre of the device's display. Other similar transition effects may be achieved, for example, the user may be able to pinch (that is, slide two fingers or a finger a thumb together on the screen of the first device 800) anywhere on the screen, not just in the centre. The effect seen on the screen of the second device 850 may be the pooling out of the displayed open instance of the application on the second device from a corresponding location on the second device's screen.

FIG. 8*c* shows that that a user is providing a "swirl" (which may also be called a "whirl") gesture 810 on the screen of the first device 800. The swirl gesture may be a spiral or otherwise arcuate gesture with which the user notionally 'swirls' or 'stirs' the content on the display. The open instance of the first application 806 is progressively removed from display from the first device 800 and appears as if being stirred up/swirled around e.g. as if in a whirlpool. The corresponding open instance of at least a related application 862 is progressively displayed on the second device 850, in this example as if unswirling 864 from the centre of the device's display.

FIG. 8*d* shows that the user 812 is providing a slide gesture 814 from left to right on the display of the first device 814 as if to push the screen over to the neighbouring device 850. The open instance of the first application 816 is progressively removed from display from the first device 800 and the corresponding open instance of at least a related application 866 is progressively displayed on the second device 850. The user may, in other examples, provide a push slide gesture in any direction, for example from left to right, right to left, diagonally, from top to bottom, or from bottom to top. The open instance of the at least a related application is progressively displayed on the second device 850 in a direction corresponding to the direction of the user input made 814.

The effects provided due to the user slide inputs 856, 814 made in FIGS. 8*a* and 8*d* may, in other examples, be provided by other combinations of user inputs. For example, it may be that to distinguish a slide intended to provide an open instance of an application on a second device from a slide intended to, for example, move to a different home screen on the same device, the user may make the slide all the way across a screen from edge to edge, or possibly from outside one edge of the display to the centre of the display. Such a gesture may be considered to be made outside an application's user interface, since the slide originated from outside one edge of the display of the device running the application. Such a slide gesture may be detected by touch sensors located outside the periphery of the touch sensitive screen (e.g. on one or more edges of the device) and the 'edge' touch sensors may be used to detect the start of the slide user input. As another example, any slide/swipe user input which is detected by the touch sensitive screen as beginning at the outermost touch sensitive area of the touch sensitive display may be extrapolated as having started outside the periphery of the touch sensitive area and be recognised as a user input for providing an open instance of an application on a second device.

In other examples, the user may be required to press and hold for a predetermined period of time before sliding to indicate to the device what the intended effect of the input is (to provide an open instance of an application on a second device). Other possible inputs include, for example, a tap-and-slide, press and slide, a flick, press and flick, a multiple tap and slide or a multi finger slide. Another example may be that a device 800 comprising an accelerometer and/or gyroscope may allow the user to make such an input by tilting the device from left to right (or in another direction). This tilting action may be performed after a prior input priming the device that the user wishes to open a corresponding application on another device. Other inputs are possible as will be appreciated.

It will be appreciated that some form of (e.g. private) sharing network needs to be available between the two devices. This can be done prior to receipt of the user input to provide the corresponding open instance, or can be initiated upon the determination that such an input has been received, e.g. after detecting the particular user input, the device which has received the user input may look for devices with which it can form a network to allow for the provision of the corresponding open instance. Such networks may be preconfigured, or the device may ask the user to identify/confirm the device which will provide the corresponding open instance of the at least related application.

It may be that the source (first) device and/or the recipient (second) device may be identified due to the push/pull gesture input made by a user. Other examples of ways of identifying the devices to be involved in providing open instances of applications due to user inputs include that the identity of each device has been previously defined. This may be by a user changing a setting in a menu, or by the manufacturers pre-defining the identity. Another example is that nearby devices may be able to determine their relative distances from each other, and the device determined to be the closest to the device being interacted with by a user in the one which is involved in providing a (corresponding) open instance of an application. A further example is that nearby devices may be able to determine their relative locations from each other, and the direction of the user input made may indicate the other device to be used, for example, indicated by the direction in which the user input is made (e.g. a swipe made in the direction of the recipient device). A further example is in the case of a pull (slide) user input, all the devices available except for the source device (on which the input is being made) may be in a standby state waiting for a user input to instruct them to open a corresponding instance of at least a related application (by an open application being pulled towards that device).

FIG. 8e shows that the user is providing a voice input 814 "Go to tablet" instructing the open instance of the first application 816 to be (progressively) removed from display from the first device 800 and the corresponding open instance of at least a related application 870 to be (progressively) displayed on the second device 850. In this example the device 800 is capable of voice recognition. The user may be able to preset names for his or her devices, such as "tablet", "my phone", "screen two", so that the device 800 receiving the user voice input knows which other device (in the network) to instruct to provide an open instance of an application containing the data and transient content. In other examples, the user may be able to provide a 'pull' voice input such as "Switch from my phone" or "Take from desktop" instructing the open instance of a first application to be (progressively) removed from display from the first device (the phone or desktop) and the corresponding open instance of at least a related application to be (progressively) displayed on the second device.

FIG. 8f shows that the user has a key 880 available on a keyboard of the second device 850, which when pressed by the user 878 instructs the open instance of the first application 820 to be removed from display 822 from the first device 800 and the corresponding open instance of at least a related application 874 to be progressively displayed 876 on the second device 850. In this example, the user may be able to configure a key 880 or a particular combination of keys for this purpose. It will be appreciated that the key 880 illustrated in FIG. 8f is representative of an already existing key or combination of keys configured for the purpose of providing a corresponding open instance of a related application from an open instance of an application on another device (whether progressively or instantly).

FIG. 8g shows that the user is providing a slide gesture 884 by using a peripheral device, in this case, a mouse 888. The user is able to slide the mouse pointer 886 from left to right across the display of the second device 850 when using, for example, a right/left click together with the associated physical movement of the mouse 888 i.e. activation input. The open instance of the first application 824 is then progressively removed from display 826 from the first device 800 and the corresponding open instance of at least a related application 882 is progressively displayed on the second device 850 due to this user input with the mouse 888. The open instance of the at least a related application 882 is progressively displayed on the second device 850 in a direction corresponding to the direction of the user input made 884. The mouse pointer 886 may be able to provide the activation input by sliding along any region of the screen. For example, one region of the screen may be configured to accept a press and slide motion in that region as an input for opening a corresponding open instance of at least a related application 882 while removing 826 an open instance 824 from a first device 800. It will be appreciated that such an input from a peripheral device may also be made, for example, via a wand, a pointing stick, a touchpad, a stylus and pad, a joystick or a remote controller.

In the examples where an open instance of a first application is provided as a corresponding open instance of at least a related application by the first application being progressively removed while the at least related application is progressively displayed, the progressions (which give the impression of a transition from one to the other device) of the two applications may be matched. By being matched, it is meant that if, for example, one quarter of the first application is removed by a user input, then correspondingly one quarter of the at least related application is displayed on the second device; similarly as one third of the first application is removed, then one third of the at least related application is displayed on the second device. The speed at which the apparent transition takes place also required that the speed of progressive removal of the open application on the first device is matched by the speed of progressive display of the at least related application on the second device. This progressive apparent transition can take into account any differences in form factor or size of the different displays (see, for example, FIGS. 6a-6f).

Figure 9:
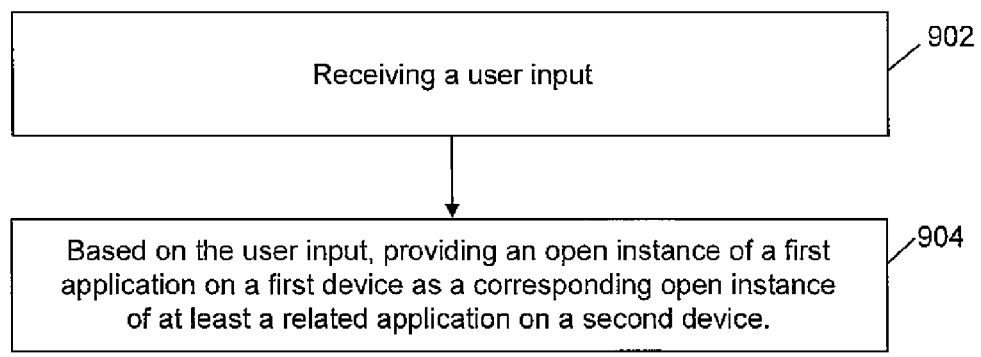
FIG. 9 illustrates a flowchart according to a method of the present disclosure.

FIG. 9 shows a flow diagram illustrating the steps of receiving a user input 902; and based on the user input, providing an open instance of a first application on a first device as a corresponding open instance of at least a related application on a second device 904, and is self-explanatory.

Figure 10:
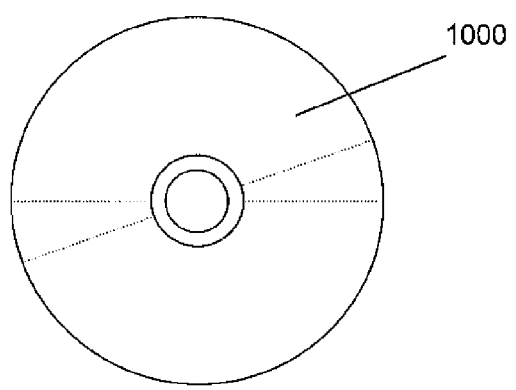
FIG. 10 illustrates schematically a computer readable medium providing a program.

FIG. 10 illustrates schematically a computer/processor readable medium 1000 providing a program according to an embodiment. In this example, the computer/processor readable medium is a disc such as a digital versatile disc (DVD) or a compact disc (CD). In other embodiments, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus shown in the above embodiments may be a portable electronic device, a laptop computer, a mobile phone, a Smartphone, a tablet computer, a personal digital assistant, a digital camera, a watch, a non-portable electronic device, a desktop computer, a monitor, a server, or a module/circuitry for one or more of the same.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions. (e.g. MP3 or other format and/or (FM/AM) radio broadcast recording/playing), downloading/sending of data functions, image capture function (e.g. using a (e.g. in-built) digital camera), and gaming functions.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
      receive a user input at a second device to continue a task being performed on a first device, the first device having an open instance of a first application on the first device; and
      in response to receipt of the user input at the second device, cause a second application to be opened on the second device independent of user input received at the first device, the second application comprising a corresponding open instance of at least one related application on the second device relating to the open instance of the first application on the first device, wherein the apparatus is configured to cause the second application to be opened by providing one or more of the same data content as on the first application on the first device in the at least one related application on the second device, the data content of the corresponding open instance of the at least one related application is provided to be editable at the at least one related application to enable the task to be continued on the second device.

2. The apparatus of claim 1, wherein the apparatus is configured such that the open instance of the first application is progressively removed from display from the first device and the corresponding open instance of the at least one related application is progressively displayed on the second device based on the user input.

3. The apparatus of claim 1, wherein the apparatus is configured such that the corresponding open instance of the at least one related application is progressively displayed on the second device in a direction corresponding to a direction of the user input received at the second device.

4. The apparatus of claim 1, wherein the apparatus is configured such that the proportion of the corresponding open instance of the at least one related application is progressively displayed on the second device based on at least a characteristic of the user input.

5. The apparatus of claim 4, wherein the characteristic of the user input comprises: the direction of the user input, the speed of the user input, and the reversal of the user input.

6. The apparatus of claim 4, wherein the characteristic of the user input provides a proportion of the open instance of the first application on the first device and a proportion of the corresponding open instance of the at least one related application on the second device to be distributed between the two devices to provide a user perception that the same application/content is being transferred between devices.

7. The apparatus of claim 6, wherein the respective proportions on the first device and the second device correspond to a full representation of the content of the first application distributed between the two devices.

8. The apparatus of claim 1, wherein the apparatus is configured such that a proportion of the open instance of the first application is progressively removed from display on the first device and the proportion of the corresponding open instance of the at least one related application is correspondingly progressively displayed on the second device based on the at least a characteristic of the user input.

9. The apparatus of claim 1, wherein the apparatus is configured such that the open instance of the first application remains displayed on the first device after the corresponding open instance of the at least one related application is displayed on the second device.

10. The apparatus of claim 1, wherein the user input comprises a swipe across a touch-sensitive region of the first device or the second device, the swipe beginning at one edge of the touch sensitive region of the apparatus.

11. The apparatus of claim 1, wherein the user input comprises a swirl gesture detected by a touch-sensitive region of the first device or the second device.

12. The apparatus of claim 1, wherein the user input comprises a voice input detected by the first device, the second device or another device.

13. The apparatus of claim 1, wherein the user input comprises a combination of one or more of the following gestures made on a touch sensitive display associated with the first or second device: a slide, a slide from one edge of a display, a tap, a multiple tap, a press, a flick, a pinch gesture, and a swirl gesture.

14. The apparatus of claim 1, wherein the apparatus is configured to receive the user input via one or more of: a wand, a pointing stick, a touchpad, a touch-screen, a stylus and pad, a mouse, a physical keyboard, a virtual keyboard, a joystick, a remote controller, a button, a microphone, a motion detector, a position detector, a scriber and an accelerometer.

15. The apparatus of claim 1, wherein the apparatus is configured to cause the second application to be opened by providing one or more of the same transient content as on the first application on the first device in the at least one related application on the second device.

16. The apparatus of claim 15, wherein the transient content comprise one or more of: a pointer position, a cursor position, a zoom factor, a location on a page, a window size, a position in an audio or video file, a window form factor, a location of a window on a display, toolbar settings, and a highlighted element.

17. The apparatus of claim 1, wherein the first application and the at least one related application are provided for use on the respective first and second devices by accessing respective one or more memories located with the first and second devices.

18. The apparatus of claim 1, wherein the first application and the at least one related application provide a common level of functionality which is provided in the respective open instances of the first and the at least one related application using the same operating system of the respective first and second devices.

19. The apparatus of claim 1, wherein the first application and the at least one related application provide a common level of functionality which is provided in the respective open instances of the first and the at least one related application using different operating systems of the respective first and second devices.

20. The apparatus of claim 1, wherein the first application and the at least one related application are equivalent applications provided using the same operating system of the respective first and second devices.

21. The apparatus of claim 1, wherein the first application and the at least one related application are equivalent applications provided using different operating systems of the respective first and second devices.

22. The apparatus of claim 1, wherein the first application and the at least one related application are provided for use on the respective first and second devices by communication with at least one remote server.

23. The apparatus of claim 1, wherein the first application and the at least one related application are the same application provided for use on the respective first and second devices by communication with at least one remote server.

24. The apparatus of claim 1, wherein the first and second devices are independently operable to provide the functionality of the first application and the at least one related application.

25. The apparatus of claim 24, wherein independently operable devices can be used without connection to another device.

26. The apparatus of claim 1, wherein the first and second devices are configured to independently run a plurality of applications providing respective functionalities.

27. The apparatus of claim 1, wherein the data content comprise one or more of: text, numbers, fields, cells, image content, audio content, video content, and webpage content.

28. The apparatus of claim 1, wherein the open instance of a first application provided on the first device has substantially a different appearance to the corresponding open instance of the at least one related application provided on the second device.

29. The apparatus of claim 1, wherein the apparatus is a portable electronic device, a laptop computer, a mobile phone, a smartphone, a tablet computer, a personal digital assistant, a digital camera, a watch, a non-portable electronic device, a desktop computer, a monitor, a server, or a module/circuitry for one or more of the same.

30. The apparatus of claim 1, wherein a display of the first device and a display of the second device each have one or more of: different display sizes, different display form factors, different display resolutions, and different display colour schemes and the apparatus is configured to consider these different aspects in the provision of the corresponding open instance on the second device.

31. The apparatus of claim 1, wherein the first device and the second device are configured to be communicatively linked by a combination of one or more of: an infra-red connection, a Bluetooth connection, a wireless connection, a radio frequency identification (RFID) connection, a telephonic connection, a physical wired connection, a network connection, and manually.

32. The apparatus of claim 31, wherein the communicative link between the first device and the second device allows for the transient content associated with the first open instance of a first application to be provided from the first device to the second device.

33. The apparatus of claim 1, wherein the apparatus is configured such that the open instance of the first application is removed from display from the first device and the corresponding open instance of the at least one related application is displayed on the second device based on the user input.

34. A method comprising:
receiving a user input at a second device to continue a task being performed on a first device, the first device having an open instance of a first application on the first device; and
in response to receiving the user input at the second device, causing a second application to be opened on the second device independent of user input received at the first device, the second application comprising a corresponding open instance of at least one related application on the second device relating to the open instance of the first application on the first device, wherein causing the second application to be opened comprises providing one or more of the same data content as on the first application on the first device in the at least one related application on the second device, the data content of the corresponding open instance of the at least one related application is provided to be editable at the at least one related application to enable the task to be continued on the second device.

35. A non-transient computer readable medium including computer program code configured to provide for, when executed on at least one processor having at least one memory, at least the following:
receiving a user input at a second device to continue a task being performed on a first device, the first device having an open instance of a first application on the first device; and
in response to receiving the user input at the second device, causing a second application to be opened on the second device independent of user input received at the first device, the second application comprising a corresponding open instance of at least one related application on a second device relating to the open instance of the first application on the first device, wherein causing the second application to be opened comprises providing one or more of the same data content as on the first application on the first device in the at least one related application on the second device, the data content of the corresponding open instance of the at least one related application is provided to be editable at the at least one related application to enable the task to be continued on the second device.

36. An apparatus, the apparatus comprising:
means for receiving a user input at a second device to continue a task being performed on a first device, the first device having an open instance of a first application on the first device; and
in response to receiving the user input at the second device, means for causing a second application to be opened on the second device independent of user input received at the first device, the second application comprising a corresponding open instance of at least one related application on the second device relating to the open instance of the first application on the first device, wherein the means for causing the second application to be opened further comprises means for providing one or more of the same data content as on the first application on the first device in the at least one related application on the second device, the data content of the corresponding open instance of the at least one related application is provided to be editable at the at least one related application to enable the task to be continued on the second device.

* * * * *